United States Patent
Yang et al.

(10) Patent No.: US 12,120,508 B2
(45) Date of Patent: Oct. 15, 2024

(54) METHOD FOR DUPLICATING NEAR FIELD COMMUNICATION CARD AND ELECTRONIC DEVICE THEREFOR

(71) Applicant: Samsung Electronics Co., Ltd., Suwon-si (KR)

(72) Inventors: Yi Yang, Suwon-si (KR); Hyuntae Lee, Suwon-si (KR); Sungjun Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 326 days.

(21) Appl. No.: 17/499,575

(22) Filed: Oct. 12, 2021

(65) Prior Publication Data

US 2022/0038899 A1    Feb. 3, 2022

Related U.S. Application Data

(63) Continuation of application No. PCT/KR2020/005053, filed on Apr. 16, 2020.

(30) Foreign Application Priority Data

Apr. 16, 2019   (KR) .................. 10-2019-0044351

(51) Int. Cl.
*H04W 12/06*     (2021.01)
*H04W 12/041*    (2021.01)
(Continued)

(52) U.S. Cl.
CPC ......... *H04W 12/06* (2013.01); *H04W 12/041* (2021.01); *H04W 12/47* (2021.01); *H04B 5/70* (2024.01)

(58) Field of Classification Search
CPC ....... H04W 4/80; H04W 12/06; H04W 12/47; H04W 4/00; H04W 4/50
(Continued)

(56) References Cited

U.S. PATENT DOCUMENTS 8,827,164 B2   9/2014  Jolivet
9,943,206 B2 * 4/2018  Yang ................. H04W 4/80
(Continued)

FOREIGN PATENT DOCUMENTS

CN     104008353    8/2014
KR     10-0543224   1/2006
(Continued)

OTHER PUBLICATIONS

International Search Report for PCT/KR2020/005053 dated Aug. 13, 2020, 4 pages.
(Continued)

*Primary Examiner* — Lizbeth Torres-Diaz
(74) *Attorney, Agent, or Firm* — NIXON & VANDERHYE P.C.

(57) ABSTRACT

The disclosure relates to duplication of a near field communication (NFC) card, and an operating method for an electronic device may comprise: detecting a tag of the NFC card; obtaining at least one parameter related to the NFC card; and based on the NFC card satisfying a specified condition, producing a duplicate card of the NFC card by storing the at least one parameter. The specified condition may include the features wherein the NFC card is a designated type of a card and the NFC card uses a default key.

20 Claims, 23 Drawing Sheets

(51) Int. Cl.
*H04W 12/47* (2021.01)
*H04B 5/70* (2024.01)

(58) Field of Classification Search
USPC .................................. 726/6, 16–117, 20–21
See application file for complete search history.

(56) References Cited

U.S. PATENT DOCUMENTS

| | | |
|---|---|---|
| 2014/0245428 A1 | 8/2014 | Li et al. |
| 2016/0180312 A1 | 6/2016 | Salihi |
| 2016/0205543 A1 | 7/2016 | Corda et al. |
| 2018/0115948 A1* | 4/2018 | Choi ...................... H04L 47/29 |
| 2019/0090308 A1* | 3/2019 | Shin ........................ H04W 8/18 |
| 2020/0076475 A1* | 3/2020 | Teruyama ............... H04W 4/00 |
| 2020/0175495 A1 | 6/2020 | Omojola et al. |
| 2022/0366199 A1* | 11/2022 | Volkerink ........ G06K 19/07718 |

FOREIGN PATENT DOCUMENTS

| | | |
|---|---|---|
| KR | 10-2011-0000666 | 1/2011 |
| KR | 10-1020057 | 3/2011 |
| KR | 10-2013-0142864 | 12/2013 |
| KR | 10-2014-0000890 | 1/2014 |
| KR | 10-2015-0110875 | 10/2015 |
| KR | 10-2016-0013527 | 2/2016 |
| KR | 10-2016-0099320 | 8/2016 |
| KR | 10-1830982 | 2/2018 |

OTHER PUBLICATIONS

Written Opinion of the ISA for PCT/KR2020/005053 dated Aug. 13. 2020, 6 pages.
Office Action for KR Application No. 10-2019-0044351 dated Jun. 17, 2024 and English translation, 26 pages.

* cited by examiner

METHOD FOR DUPLICATING NEAR FIELD COMMUNICATION CARD AND ELECTRONIC DEVICE THEREFOR

CROSS-REFERENCE TO RELATED APPLICATIONS

This application is a continuation of International Application No. PCT/KR2020/005053 designating the United States, filed on Apr. 16, 2020, in the Korean Intellectual Property Receiving Office and claiming priority to Korean Patent Application No. 10-2019-0044351, filed on Apr. 16, 2019, in the Korean Intellectual Property Office, the disclosures of which are incorporated by reference herein in their entireties.

BACKGROUND

Field

The disclosure relates to a method of duplicating a Near Field Communication (NFC) card and an electronic device therefor.

Description of Related Art

A Near Field Communication (NFC) card is widely used all over the world. For example, the NFC card is used for various purposes such as an identification (ID) card for entry and exit, an access card, or a transportation card. A Mifare® card is used as one of the NFC cards, and there are Mifare Classic® cards having a default key as simple ID cards/access cards. Through an NFC module of an electronic device, a user can read information on NFC cards such as the Mifare® card on the basis of a read function of an NFC tag and simulate the NFC card on the basis of an emulation function.

After duplicating the NFC card to the electronic device, the user can use the electronic device as the NFC card. For example, the duplication of the Mifare Classic® card may correspond to the generation of a new instance in an embedded Secure Element (eSE) through a Mifare4Mobile (M4M) module, and the new instance may include Radio Frequency (RF) parameters and block information which are the same as those in the NFC card. When the instance is activated by an application, an NFC Contactless Front-end (CLF) may update an RF parameter from the instance.

A procedure of duplicating a Near Field Communication (NFC) card using an embeded Secure Element (eSE) may require much signaling with a backend Trust Service Management (TSM) server and use a treasure memory having a limited capacity within the eSE. Due to requirements for the TSM server and the eSE, a lot of money and time may be spent to duplicate a card.

SUMMARY

Embodiments of the disclosure may provide a method of duplicating an NFC card with low cost and time and an electronic device therefor.

According to various example embodiments of the disclosure, a method of operating an electronic device may include: detecting tagging of a Near Field Communication (NFC) card, acquiring at least one parameter related to the NFC card, and based on the NFC card satisfying a specified condition, generating a copy card of the NFC card by storing the at least one parameter. The specified condition may include the NFC card corresponding to a predetermined card and the NFC card using a default key.

According to various example embodiments of the disclosure, a method of operating an electronic device may include: based on a copy card being selected, identifying that an original card of the copy card is a specified type card and that the copy card is generated based on information which can be acquired without any authentication using a key, changing a configuration of a Near Field Communication Controller (NFCC) to use at least one parameter related to the stored copy card, and transmitting the at least one parameter to an external reader device through the NFCC.

According to various example embodiments of the disclosure, an electronic device may include: a wireless communication circuit configured to support a Near Field Communication (NFC) protocol, a display, a processor operatively connected to the wireless communication circuit and the display, and a memory operatively connected to the processor. The memory may store instructions which, when executed, cause the processor to: receive a first input for registering an external card supporting NFC in the electronic device, receive Radio Frequency (RF) parameters including an Answer to a Request Acc. (ATQA), a Selection Acknowledge (SAK), and a Unique Identifier (UID) from the external card through the wireless communication circuit based on at least a portion of the first input, store the RF parameters in the processor, determine whether the card is a specified type of card (e.g. Mifare Classic®), based on the received SAK, duplicate a data block from the card using a default key, based on at least some of a determination result, receive a second input requesting activating the card after duplicating the data block, access at least some of the stored RF parameters based on at least a portion of the second input, configure at least some RF parameter used by the wireless communication circuit based on at least some of the stored RF parameters, and communicate with an external electronic device through the wireless communication circuit.

According to various example embodiments of the disclosure, an electronic device may include: a memory, a Near Field Communication Controller (NFCC), and a processor operatively connected to the memory and the NFCC. The processor may be configured to: detect tagging of the NFC card through the NFCC and acquire at least one parameter related to the NFC card. Based on the NFC card satisfying a specified condition, the processor may be configured to perform control to generate a copy card of the NFC card by storing at least one parameter. The specified condition may include the NFC card corresponding to a specified card and the NFC card using a default key.

A method and an electronic device therefor according to various example embodiments can generate and use a copy card with relatively less resources and for shorter time compared to the case in which a Trust Service Management (TSM) server is used.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments will be described in detail with reference to the accompanying drawings.

Figure 1:
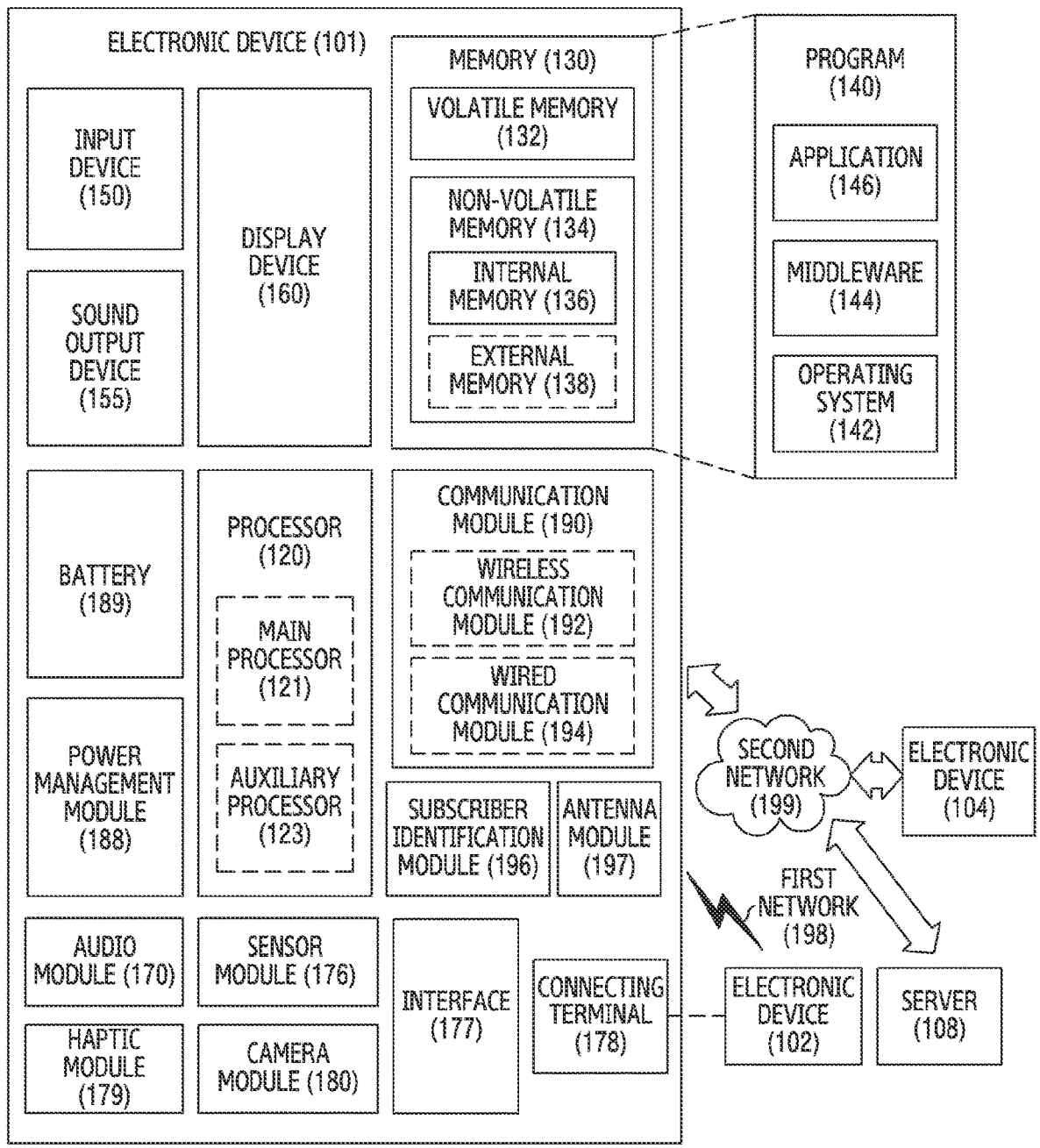
FIG. 1 is a block diagram illustrating an example electronic device within a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
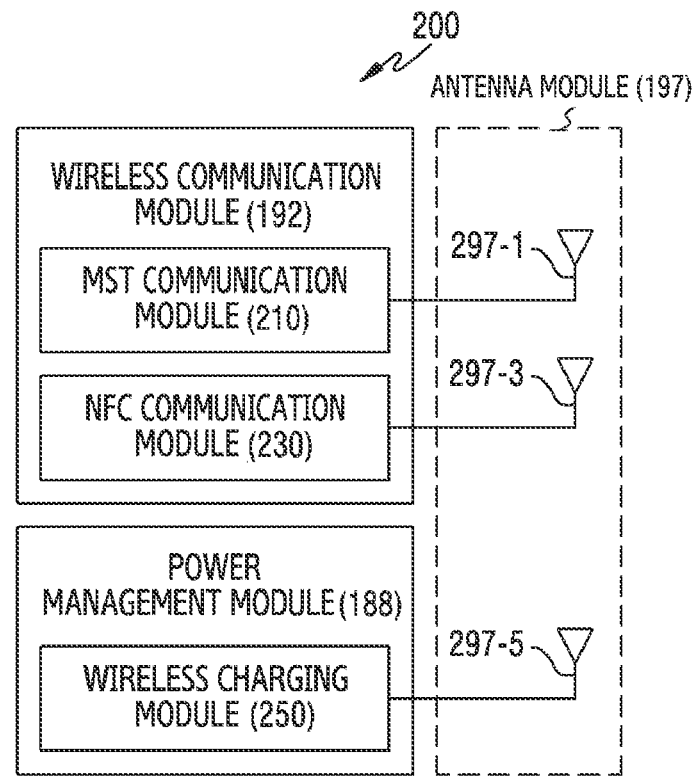
FIG. 2 is a block diagram illustrating an example configuration of an electronic device according to various embodiments.

FIG. 2 is a block diagram 200 illustrating an example configuration of the wireless communication module 192, the power management module 188, and the antenna module 197 of the electronic device 101 according to various embodiments. Referring to FIG. 2, the wireless communication module 192 may include a magnetic secure transmission (MST) communication module (e.g., including MST circuitry) 210 and/or a near-field communication (NFC) module (e.g., including NFC circuitry) 230, and the power management module 188 may include a wireless charging module (e.g., including wireless charging circuitry) 250. In such a case, the antenna module 197 may include a plurality of antennas that include a MST antenna 297-1 connected with the MST communication module 210, a NFC antenna 297-3 connected with the NFC communication module 230, and a wireless charging antenna 297-5 connected with the wireless charging module 250. For ease of description, the same components as those described in regard to FIG. 1 are briefly described or omitted from the description.

The MST communication module 210 may include various MST circuitry and receive a signal containing control information or payment information such as card information from the processor 120, generate a magnetic signal corresponding to the received signal, and then transfer the generated magnetic signal to the external electronic device 102 (e.g., a point-of-sale (POS) device) via the MST antenna 297-1. To generate the magnetic signal, according to an embodiment, the MST communication module 210 may include a switching module (not shown) that includes one or more switches connected with the MST antenna 297-1, and control the switching module to change the direction of voltage or current supplied to the MST antenna 297-1 according to the received signal. The change of the direction of the voltage or current allows the direction of the magnetic signal (e.g., a magnetic field) emitted from the MST antenna 297-1 to change accordingly. If detected at the external electronic device 102, the magnetic signal with its direction changing may cause an effect (e.g., a waveform) similar to that of a magnetic field that is generated when a magnetic card corresponding to the card information associated with the received signal is swiped through a card reader of the electronic device 102. According to an embodiment, for example, payment-related information and a control signal that are received by the electronic device 102 in the form of the magnetic signal may be further transmitted to an external server 108 (e.g., a payment server) via the network 199.

The NFC communication module 230 may include various NFC circuitry and obtain a signal containing control information or payment information such as card information from the processor 120 and transmit the obtained signal to the external electronic device 102 via the NFC antenna 297-3. According to an embodiment, the NFC communication module 230 may receive such a signal transmitted from the external electronic device 102 via the NFC antenna 297-3.

The wireless charging module 250 may include various wireless charging circuitry and wirelessly transmit power to the external electronic device 102 (e.g., a cellular phone or wearable device) via the wireless charging antenna 297-5, or wirelessly receive power from the external electronic device 102 (e.g., a wireless charging device). The wireless charging module 250 may support one or more of various wireless charging schemes including, for example, a magnetic resonance scheme or a magnetic induction scheme.

According to an embodiment, some of the MST antenna 297-1, the NFC antenna 297-3, or the wireless charging antenna 297-5 may share at least part of their radiators. For example, the radiator of the MST antenna 297-1 may be used as the radiator of the NFC antenna 297-3 or the wireless charging antenna 297-5, or vice versa. In such a case, the antenna module 197 may include a switching circuit (not shown) adapted to selectively connect (e.g., close) or disconnect (e.g. open) at least part of the antennas 297-1, 297-3, or 297-5, for example, under the control of the wireless communication module 192 (e.g., the MST communication module 210 or the NFC communication module 230) or the power management module (e.g., the wireless charging module 250). For example, when the electronic device 101 uses a wireless charging function, the NFC communication module 230 or the wireless charging module 250 may control the switching circuit to temporarily disconnect at least one portion of the radiators shared by the NFC antenna 297-3 and the wireless charging antenna 297-5 from the NFC antenna 297-3 and to connect the at least one portion of the radiators with the wireless charging antenna 297-5.

According to an embodiment, at least one function of the MST communication module 210, the NFC communication module 230, or the wireless charging module 250 may be controlled by an external processor (e.g., the processor 120). According to an embodiment, at least one specified function (e.g., a payment function) of the MST communication module 210 or the NFC communication module 230 may be performed in a trusted execution environment (TEE). According to an embodiment, the TEE may form an execution environment in which, for example, at least some designated area of the memory 130 is allocated to be used for performing a function (e.g., a financial transaction or personal information-related function) that requires a relatively high level of security. In such a case, access to the at least some designated area of the memory 130 may be restrictively permitted, for example, according to an entity accessing thereto or an application being executed in the TEE.

Figure 3:
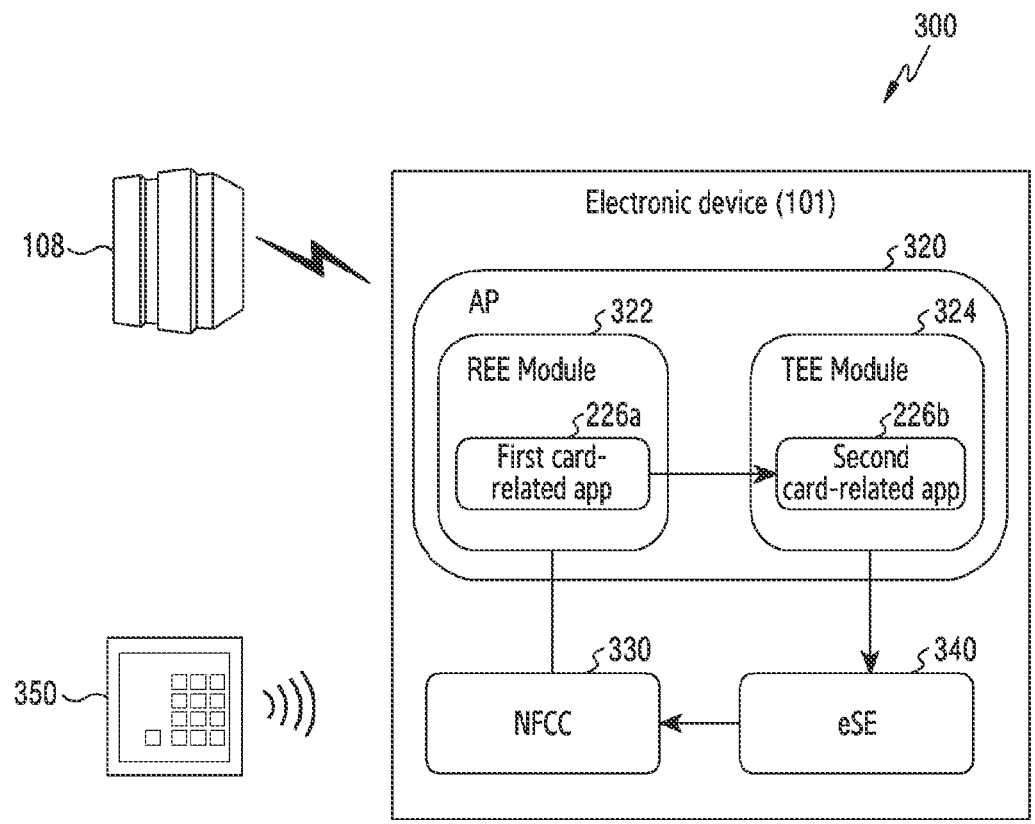
FIG. 3 is a diagram illustrating an example system including objects related to card duplication according to various embodiments.

FIG. 3 is a diagram illustrating an example system 300 including objects related to card duplication according to various embodiments of the disclosure. Referring to FIG. 3, the system 300 may include the electronic device 101, the server 108, and/or the reader device 350.

The server 108 may be a Trust Service Management (TSM) server. The server 108 may possess information on a Near Field Communication (NFC) card and provide the information on the NFC card in response to a request from the electronic device 101. According to an embodiment, the server 108 may not be used when the NFC card is duplicated.

The reader device 350 may be a device that reads the NFC card. The reader device 350 may read information stored in the NFC card from the electronic device 101 when the card is simulated in the electronic device 101. Simulation may refer, for example, to an operation using a card through an electronic device rather than a real card, and may be performed when the electronic device stores information stored in the card and outputs the stored information through the wireless communication module 192. The reader device 350 may be installed in various devices (for example, a locking device or a payment processing device) which can interwork with the NFC card.

The electronic device 101 may include an AP 320 (for example, the processor 120 of FIG. 1, an NFC Controller (NFCC) 330, and an embedded Secure Element (eSE) 340, and the AP 320 may include a Rich trusted Execution Environment (REE) module 322 and/or a Trusted Execution Environment (TEE) module.

The REE module 322 and the TEE module 324 may provide independent execution environments (for example, a normal world or a trusted world), and the TEE module 324 may guarantee a high security level compared to the REE module 322. For example, the TEE module 324 may have an authority to access specific hardware resources (for example, a memory area) and control the eSE 340. The REE module 322 may execute a first card-related app 326*a*, and the TEE module 324 may execute a second card-related app 326*b*. The first card-related app 326*a* and the second card-related app 326*b* may perform the same function, and the second card-related app 326*b* may process a transaction having a higher security level than the first card-related app 326*a*.

The NFCC 330 may be an element for performing a function related to the NFC card by the electronic device 101. For example, the NFCC 330 may transmit and/or receive and generate and/or analyze a signal related to the NFC card. The NFCC 330 may perform an NFC-related function according to control of a host (for example, the AP 320 or the eSE 340). For example, the NFCC 330 may include the NFC communication module 230 of FIG. 2.

The eSE 340 may be an element for processing transaction having a security level higher than a predetermined level. The eSE 340 may include a storage space. For example, the eSE 340 may store information on the card provided from the server 108. According to an embodiment, the eSE 340 may not be used when the NFC card is duplicated.

In the environment of FIG. 3, the electronic device 101 may duplicate the NFC card according to a first scheme and a second scheme and use the duplicated card. Hereinafter, for convenience of description, the duplicated card may be referred to as a 'copy card'. The first scheme and the second scheme according to various embodiments may be distinguished according to whether the server 108 and the eSE 340 are used. For example, the first scheme may a scheme in which card-related information is acquired and stored by the AP 320 without the use of the server 108 and the eSE 340 and the NFCC 330 operates according to control of the AP 320, and the second scheme may be a scheme in which card-related information is acquired and stored through the server 108 and the eSE 340. The first scheme may be a scheme in which information (hereinafter, referred to as a "parameter" or an "RF parameter") required for generating a signal transmitted from the NFC card through a wireless signal is acquired and stored when the electronic device 101 tags the NFC card, and the second scheme may be a scheme in which RF parameters and block information in the NFC card are acquired, information for generating an instance is acquired from the TSM server 108, and the instance is generated and stored on the basis of the acquired information when the electronic device 101 tags the NFC card.

The first scheme may more rapidly generate and/or use the copy card in compared to the second scheme, but may be applied when predetermined conditions are satisfied. For example, the predetermined conditions may include the NFC card corresponding to a card in a predetermined (e.g. specified) type (for example, Mifare®) and/or the NFC card using a default key. The key is a value required for authenticating an authority to read, write, or modify block information of the NFC card, and the default key may be a key set to have a known value (for example, FFFFFFFFFFFF).

According to various example embodiments of the disclosure, the electronic device (for example, the electronic device 101) may include: a memory (for example, the memory 130), an NFCC (for example, the NFCC 330), and a processor (for example, the processor 120 or the AP 320) operatively connected to the memory and the NFCC. The processor may be configured to: detect tagging of the NFC card through the NFCC and acquire at least one parameter related to the NRF card. Based on the NFC card satisfying a specified condition, the processor may be configured to perform control to generate a copy card of the NFC card by storing at least one parameter. The specified condition may include the NFC card corresponding to a predetermined card and the NFC card using a default key.

According to various example embodiments of the disclosure, at least one parameter may include information which can be acquired without any authentication using a key and may include at least one of an ATQA, a UID, or an SAK.

According to various example embodiments of the disclosure, the processor (for example, the processor 120 or the AP 320) may be configured to examine values of at least one parameter and determine whether the NFC card is the specified type card.

According to various example embodiments of the disclosure, the processor (for example, the processor 120 or the AP 320) may be configured to: attempt authentication of the NFC card through the default key and determine whether the NFC card uses the default key.

According to various example embodiments of the disclosure, the processor (for example, the processor 120 or the AP 320) may be configured to: acquire information on the NFC card from the TSM server based on the NFC card not satisfying the specified condition, and store a generated instance in a secure element based on the acquired information to generate the copy card.

According to various example embodiments of the disclosure, at least one parameter may be stored in the REE (for example, the REE 322) or the TEE (for example, the TEE 324).

According to various example embodiments of the disclosure, an electronic device (For example, the electronic device 101) may include: a wireless communication circuit (for example, the NFCC 330) configured to support an NFC protocol, a display (for example, the display device 160), a processor (for example, the processor 120 or the AP 320) operatively connected to the wireless communication circuit and the display, and a memory (for example, the memory 130) operatively connected to the processor. The memory may store instructions which, when executed, cause the processor to: receive a first input for registering an external card supporting NFC in the electronic device, receive Radio Frequency (RF) parameters including an ATQA, an SAK, and a UID from the external card through the wireless communication circuit based on at least a portion of the first input, store the RF parameters in the processor, determine whether the card is a specified card (e.g., a Mifare Classic® card), based on the received SAK, duplicate a data block from the card using a default key, based on at least a portion of a determination result, receive a second input making a request for activating the card after duplicating the data block, access at least some of the stored RF parameters, based on at least a portion of the second input, configure at least some RF parameter used by the wireless communication circuit, based on at least some of the stored RF parameters, and communicate with an external electronic device through the wireless communication circuit.

According to various example embodiments of the disclosure, the instructions may cause the processor (for example, the processor 120 or the AP 320) to determine whether the card is the specified (e.g., Mifare Classic®) card based on a sixth bit of the received SAK.

According to various example embodiments of the disclosure, based on the data block not being able to be duplicated from the card using the default key, the instructions, when executed, may cause the processor (for example, the processor 120 or the AP 320) to control the display to display a notification indicating failure in card duplication through the display.

According to various example embodiments of the disclosure, based on the data block not being able to be duplicated from the card using the default key, the instructions, when executed, may cause the processor (for example, the processor 120 or the AP 320) to: acquire information on the card from a Trust Service Management (TSM) server and store an instance generated based on the acquired information in a secure element.

According to various example embodiments of the disclosure, the instructions, when executed, may cause the processor (for example, the processor 120 or the AP 320) to: determine whether an authentication information request is received from the external electronic device and delete the stored RF parameters in response to the authentication information request based on a determination result.

According to various example embodiments of the disclosure, the RF parameters may be stored in a Rich trusted Execution Environment (REE) or a Trusted Execution Environment (TEE).

Figure 4:
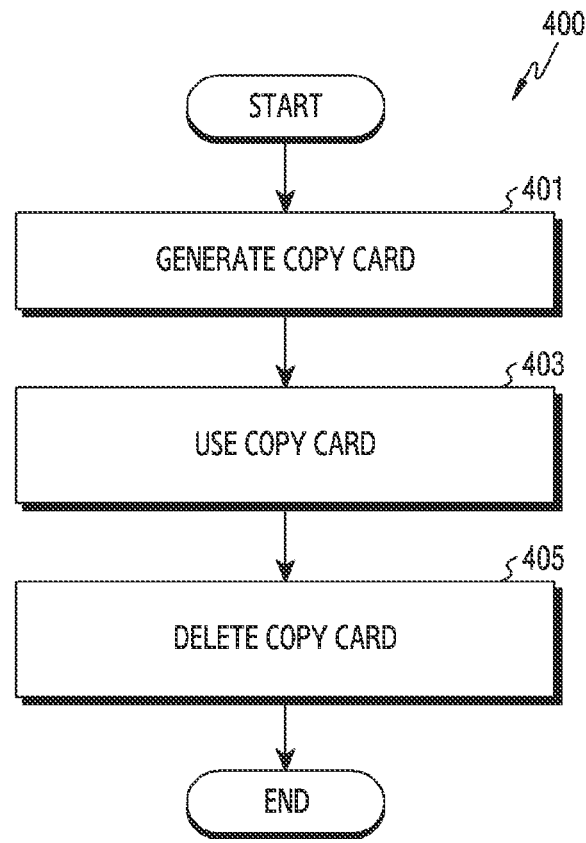
FIG. 4 is a flowchart illustrating an example operation in which the electronic device processes a copy card according to various embodiments.

FIG. 4 is a flowchart 400 illustrating an example operation in which the electronic device processes a copy card according to various embodiments. An entity performing the operation in the flowchart 400 of FIG. 4 may be understood as the electronic device 101 or an element of the electronic device 101 (for example, the processor 120 or the AP 320).

Referring to FIG. 4, in operation 401, the electronic device 101 (for example, the processor 120 or the AP 320) may generate a copy card. According to an embodiment, in order to generate a copy card according to a first scheme, the electronic device 101 may read and store information on an original card in a reader mode. The reader mode is a state in which the electronic device operates as a reader device (for example, the reader device 350 of FIG. 3) and may correspond to a state in which the NFCC 330 of the electronic device 101 operates to read information on a real NFC card. In a reader mode, the NFCC 330 may be controlled to transmit a polling signal making a request for card information. According to an embodiment, the electronic device 101 may determine whether duplication according to the first scheme is possible on the basis of a characteristic of the original card. According to an embodiment, in order to generate a copy card according to a second scheme, the electronic device 101 may receive information for generating an instance for the card from a TSM server (for example, the server 108 of FIG. 3) and generate the instance in an eSE (for example, the eSE 340 of FIG. 3).

In operation 403, the electronic device 101 may use the copy card. The electronic device 101 may emulate the copy card on the basis of stored copy card-related information. For example, the electronic device 101 may change a configuration of an NFCC (for example, the NFCC 330 of FIG. 3) and control the NFCC to transmit a signal including copy card-related information. The electronic device 101 may detect a polling signal of an external reader (for example, the reader device 350 of FIG. 3) and control the NFCC to transmit stored card-related information in response to the polling signal.

In operation 405, the electronic device 101 may delete the copy card. For example, the electronic device 101 may discard information on the copy card to delete the copy card. The electronic device 101 may delete parameters related to the stored card according to the first scheme or delete the stored instance according to the second scheme. According to an embodiment, operation 405 may be omitted.

Figure 5:
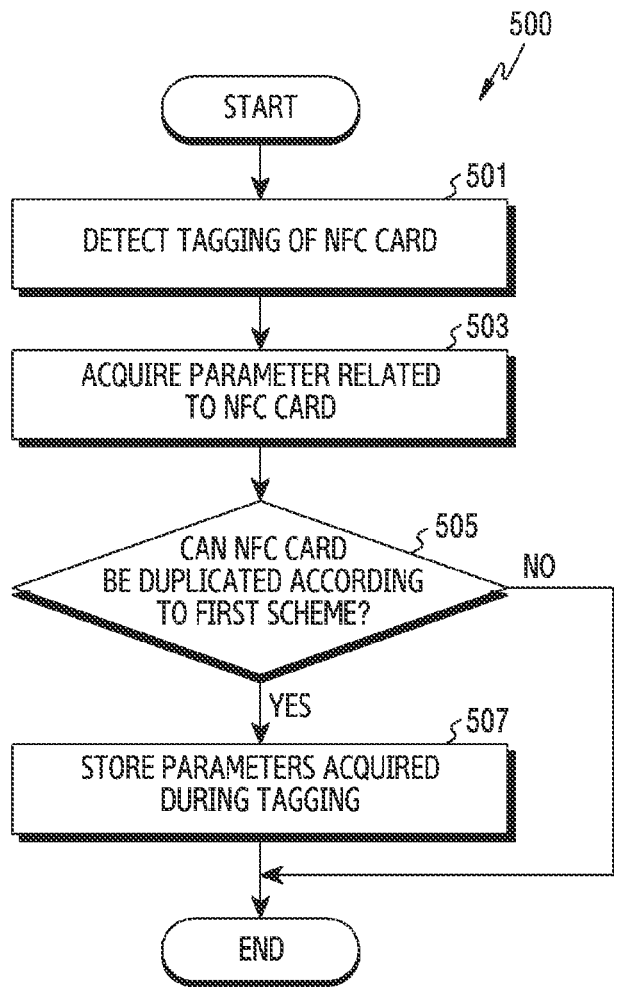
FIG. 5 is a flowchart illustrating an example operation in which the electronic device generates a copy card according to various embodiments.
Figure 8A:
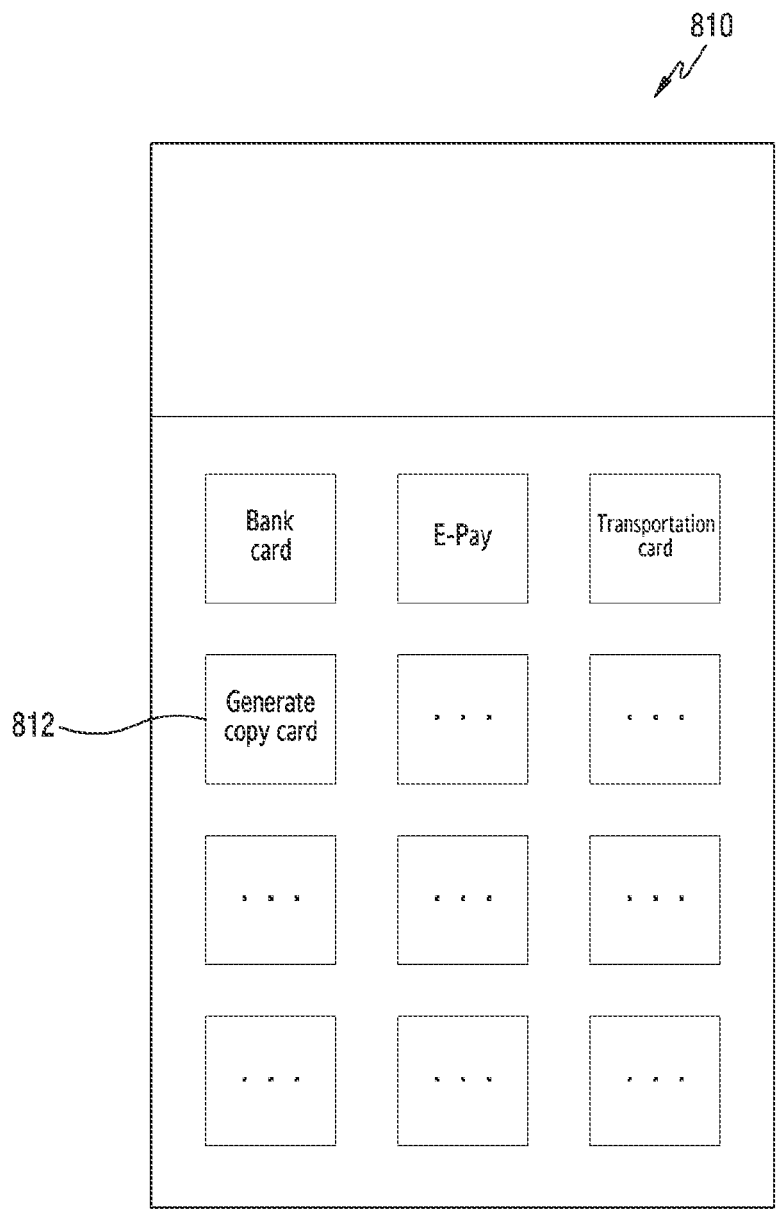
FIGS. 8A, 8B, 8C, 8D, 8E, 8F, 8G and 8H are diagrams illustrating examples of screens displayed while the electronic device generates a copy card according to various embodiments.
Figure 8B:
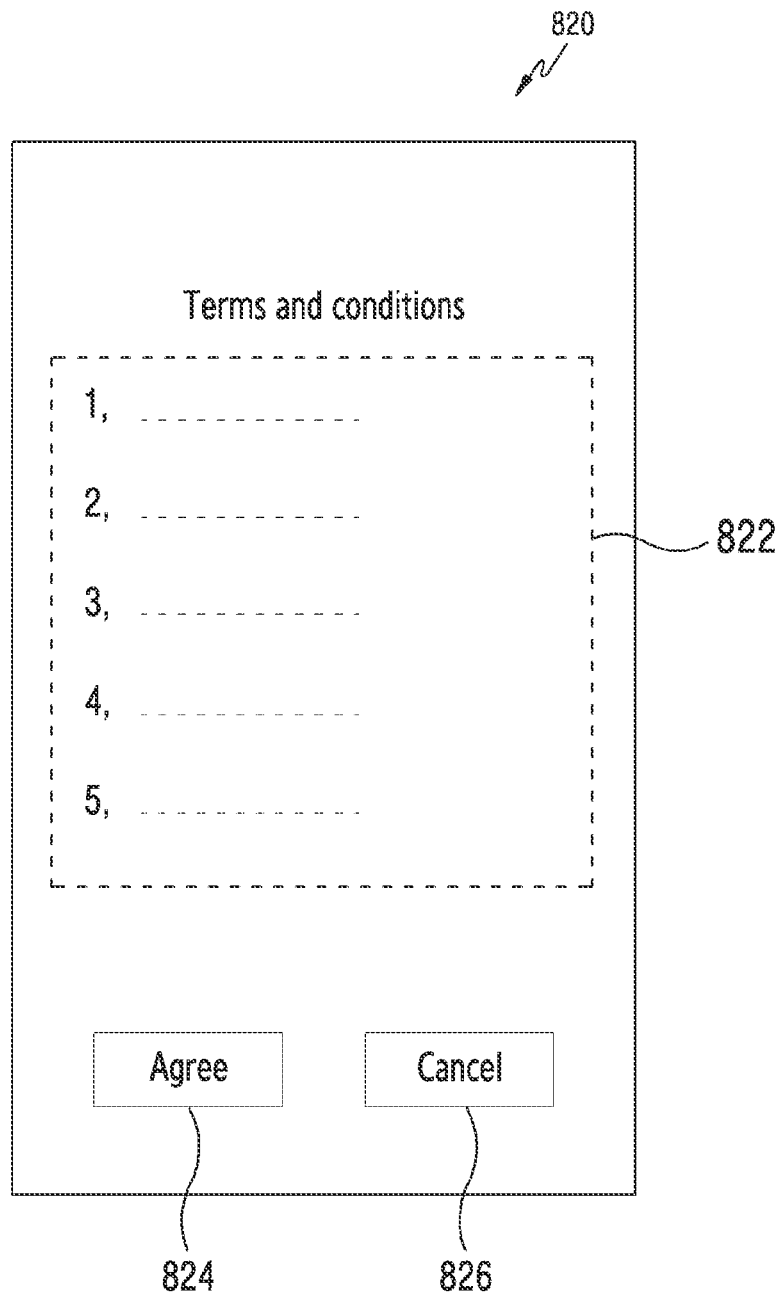
Figure 8C:
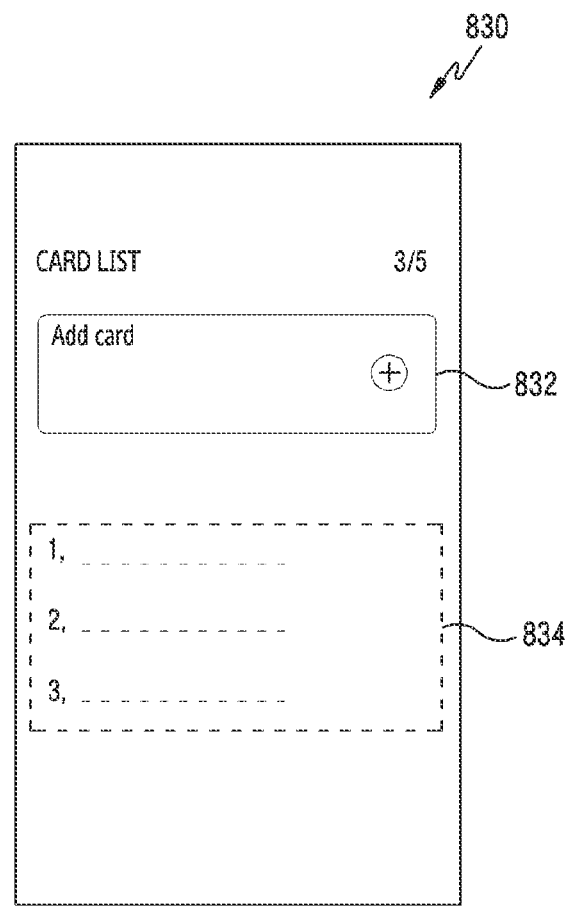

FIG. 5 is a flowchart 500 illustrating an example operation in which the electronic device generates a copy card according to various embodiments. FIGS. 8A, 8B and 8C are diagrams illustrating examples of screens displayed during an operation in which the electronic device generates a copy card according to various embodiments. An entity of the operation performing the operation in the flowchart 500 of FIG. 5 may be understood as the electronic device 101 or an element of the electronic device 101 (for example, the processor 120 of FIG. 1 or the AP 320 of FIG. 3).

Referring to FIG. 5, in operation 501, the electronic device 101 (for example, the processor 120 or the AP 320) may detect tagging of an NFC card. The electronic device 101 may control an NFCC (for example, the NFCC 330 of FIG. 3) to operate in a reader mode and detect a signal transmitted from the NFC card in the reader mode, so as to detect the NFC card. For example, the electronic device 101 may recognize a command for card duplication from the user through an interface such as illustrated at least one of a screen 810 of FIG. 8A, a screen 820 of FIG. 8B, or a screen 830 of FIG. 8C, control the NFCC to operate in the reader mode, and identify whether the NFC card responds to a polling signal transmitted in the reader mode.

In operation 503, the electronic device 101 may acquire parameters related to the NFC card. The electronic device 101 may acquire the related parameters through signaling with the NFC card. For example, the parameters are information which can be acquired without any authentication, and may include an Answer to request-type A (ATQA), a Unique Identifier (UID), and/or a Selection Acknowledge (SAK). The ATQA is a parameter transmitted as a response to transmission of a Request answer-type A (REQA) from the electronic device 101, the UID is unique identification information allocated to the NFC card, and the SAK is a parameter which can be used to identify attributes (for example, type) of the card.

In operation 505, the electronic device 101 may determine whether an original card (for example, the NFC card) can be duplicated according to a first scheme. Whether the card can be duplicated according to the first scheme may be determined according to whether the NFC card is a card in a predetermined or specified type (for example, Mifare®) and/or whether the NFC card uses a default key. In order to determine whether the NFC card belongs to the predetermined type, the electronic device 101 may check values of at least some of the acquired parameters. For example, when a value of a specific bit (for example, a sixth bit) of the SAK is not a predetermined value (for example, 1), the electronic device 101 may determine that the NFC card is a card of a type matching a duplication condition. The electronic device 101 may attempt authentication using a default key and, when the authentication is successful, determine that the NFC card uses the default key. For example, for the authentication, the electronic device 101 may transmit and/or receive at least one random value encrypted by the NFC card and the key. When duplication according to the first scheme is not possible, the electronic device 101 may determine that the NFC card cannot be duplicated and end the operations. According to an embodiment, the electronic device 101 may attempt duplication according to a second scheme.

On the other hand, when duplication according to the first scheme is possible, the electronic device 101 may store parameters acquired during tagging in operation 507. For example, when the NFC card is emulated, the electronic device 101 may store information required for generating signals transmitted from the NFC card. For example, the parameters may include an ATQA, a UDI, and/or an SAK. In another example, the parameters may further include at least some pieces of block information which can be acquired after the authentication of the NFC card. The acquired parameters may be stored in an REE (for example, the REE module 322 of FIG. 3) or a TEE (for example, the TEE module 324 of FIG. 3) or stored in a memory areas which can be accessed by the REE or the TEE.

In the example embodiment described with reference to FIG. 5, when the duplication according to the first scheme is not possible, the electronic device 101 may stop the duplication. According to an embodiment, when the duplication according to the first scheme is not possible, the electronic device 101 may generate a copy card according to a second scheme. For example, the electronic device 101 may acquire information on the NFC card from a TSM server (for example, the server 108 of FIG. 3), generate an instance on the basis of the acquired information, and store the instance in a secure element (for example, the eSE 340 of FIG. 3).

Figure 6:
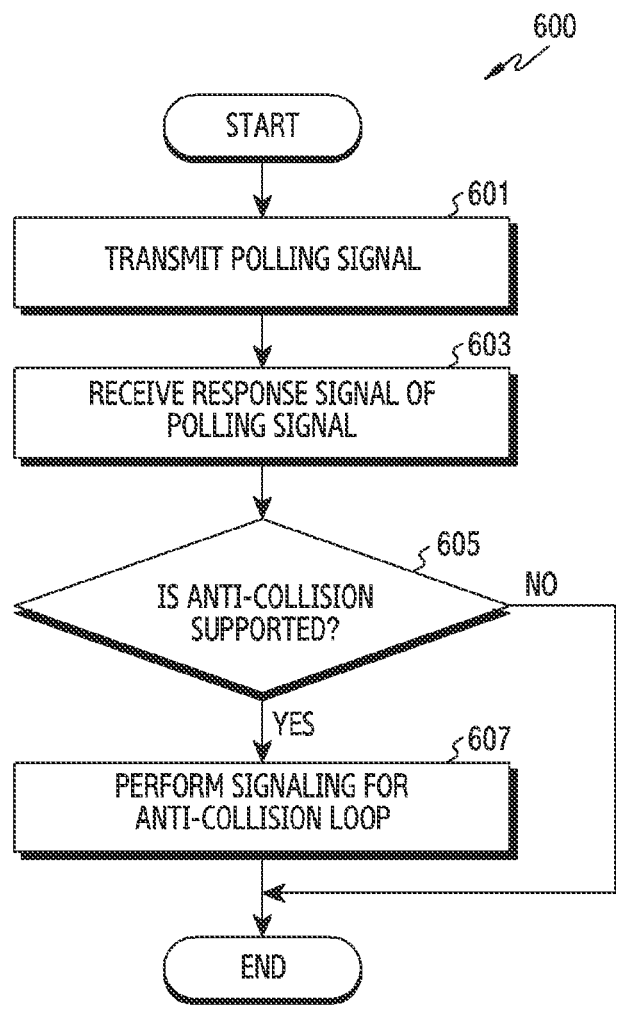
FIG. 6 is a flowchart illustrating an example operation in which the electronic device acquires information on an original card according to various embodiments.

FIG. 6 is a flowchart 600 illustrating an example operation in which the electronic device acquires information on an original card according to various embodiments of the disclosure. An entity of the operation performing the operation in the flowchart 600 of FIG. 6 may be understood as the electronic device 101 or an element of the electronic device 101 (for example, the processor 120 of FIG. 1 or the AP 320 of FIG. 3).

Referring to FIG. 6, in operation 601, the electronic device 101 (for example, the processor 120 or the AP 320) may transmit a polling signal. An NFCC (for example, the NFCC 330 of FIG. 3) of the electronic device 101 may operate in a reader mode and transmit a polling signal (for example, an REQA) making a request for a response from a near NFC card. The reader mode is a state in which the electronic device operates as a reader device (for example, the reader device 350 of FIG. 3) and may correspond to a state in which the NFCC of the electronic device 101 operates to read information on the near NFC card. In the reader mode, the electronic device 101 may repeatedly transmit the polling signal by controlling the NFCC until a response signal is received.

In operation 603, the electronic device 101 may receive a response signal of the polling signal from the NFC card. For example, when the NFC card which is the original card approaches a predetermined range from an antenna of the NFCC of the electronic device 101, the NFC card may receive the polling signal. The NFC card receiving the polling signal may transmit a response signal (for example, an ATQA), and the electronic device 101 may receive the response signal. The response signal may include information informing of whether an anti-collision function is supported.

In operation 605, the electronic device 101 may determine whether anti-collision is supported. Anti-collision may be a function of distinguishing cards through UIDs when a plurality of cards are simultaneously tagged. When anti-collision is supported, the electronic device 101 may acquire an SAK and/or a UID through the following operations. The electronic device 101 may determine whether anti-collision is supported on the basis of information included in the response signal. When anti-collision is not supported, the electronic device 101 may end the operations.

On the other hand, when anti-collision is supported, the electronic device 101 may perform signaling for an anti-collision loop in operation 607. Signaling for the anti-collision loop may include transmission of at least one signal and/or reception of at least one signal. For example, the electronic device 101 may transmit at least one anti-collision signal and/or a selection signal, and receive at least one signal including card identification information (for example, UID) and/or at least one response signal (for example, SAK).

Figure 7A:
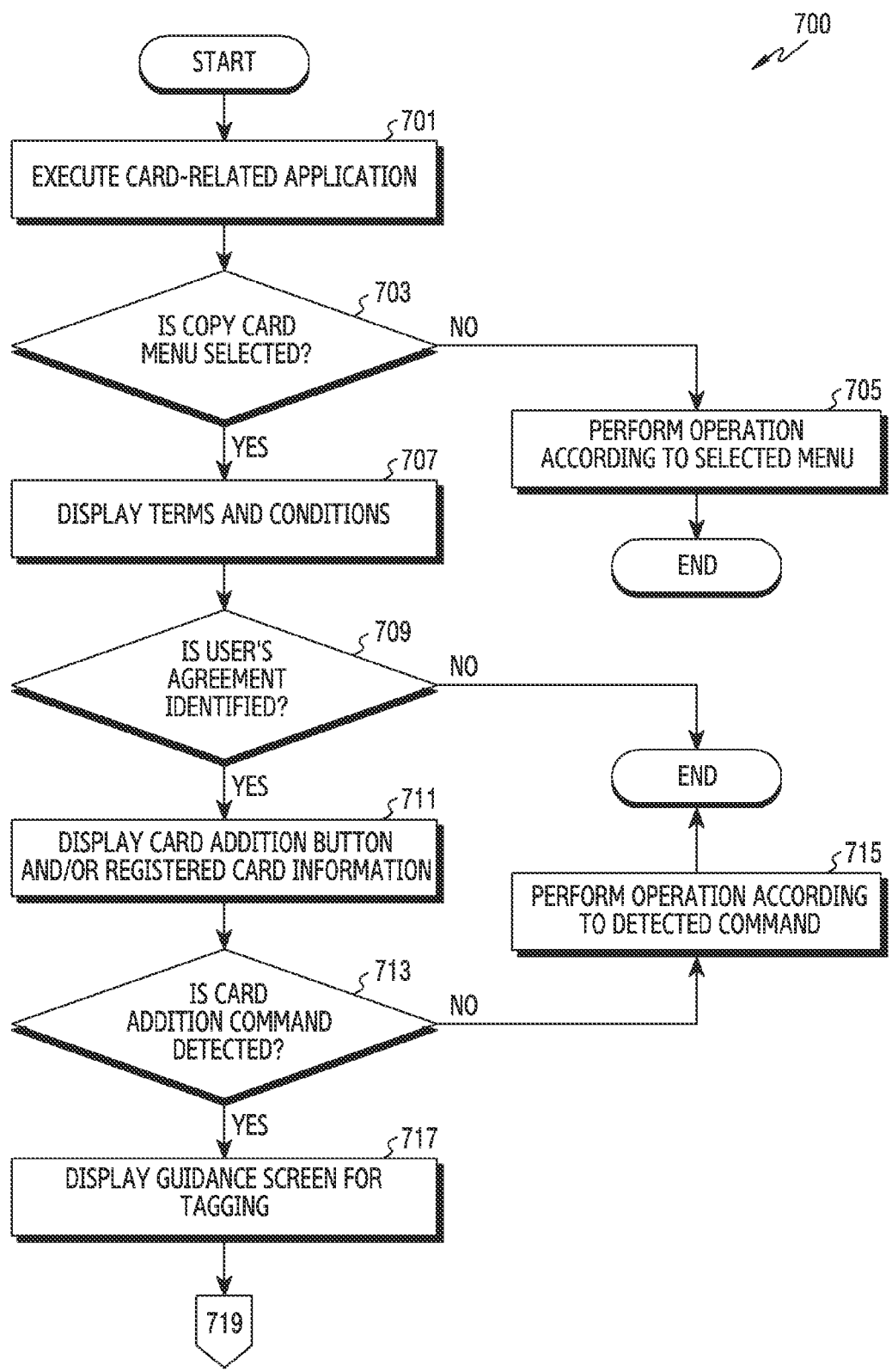
FIGS. 7A and 7B are flowcharts illustrating an example operation in which the electronic device interacts with a user while a copy card is generated according to various embodiments.
Figure 7B:
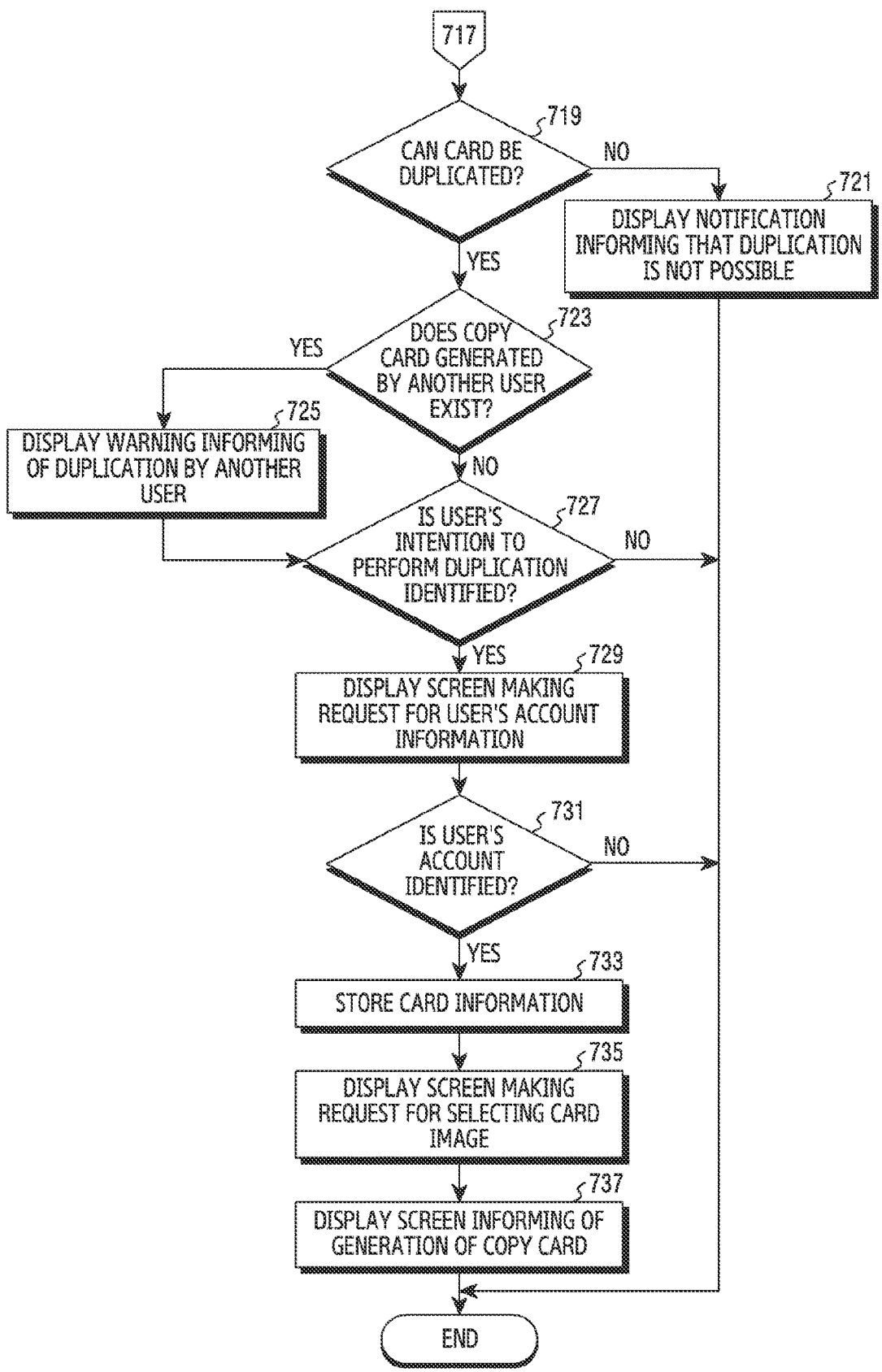

FIGS. 7A and 7B are flowcharts 700 illustrating an example operation for an interaction with the user while the electronic device generates a copy card according to various embodiments. FIGS. 8A, 8B, 8C, 8D, 8E, 8F, 8G and 8H are diagrams illustrating examples of screens displayed while the electronic device generates a copy card according to various embodiments. An entity performing the operation in the flowcharts 700 of FIGS. 7A and 7B may be understood as the electronic device 101 or an element of the electronic device 101 (for example, the processor 120 of FIG. 1 or the AP 320 of FIG. 3).

Referring to FIG. 7, in operation 701, the electronic device 101 (for example, the processor 120 or the AP 320) may execute a card-related application (for example, the first card-related app 326a or the second card-related app 326b of FIG. 3). The card-related application may be executed by a user's execution command (for example, touching an icon). According to the execution of the card-related application, the electronic device 101 may display a start screen of the card-related application. For example, as illustrated in FIG. 8A, the electronic device 101 may display a screen 810 including a plurality of menu buttons. The plurality of menu buttons may include a menu button 812 for generating a copy card. In operation 703, the electronic device 101 may identify whether the menu for generating the copy card is selected. A command for generating the copy card may be identified through detection of an input (for example, touch) of the menu button 812 of FIG. 8A.

When the menu for generating the copy card is not selected, the electronic device 101 may perform an operation according to the selected menu in operation 705. For example, the electronic device 101 may perform an operation according to another menu (for example, a band card, E-pay, or a transportation card) rather than the generation of the copy card. In another example, the electronic device 101 may end the operations.

When the menu for generating the copy card is selected, the electronic device 101 may display Terms and Conditions (T&C) in operation 707. For example, as illustrated in FIG. 8B, the electronic device 101 may include a screen 820 including terms and conditions. The screen 820 may include an explanation 822 indicating the content of terms and conditions and/or buttons 824 and 826 for identifying an agreement. According to an embodiment, the explanation 822 may include a phrase informing that current user information may be provided when another user duplicates the same card. According to an embodiment, before displaying terms and conditions, the electronic device 101 may determine whether the user is a correct user. For example, the electronic device may determine whether the user is a correct user according to whether another card (for example, a bank card) of the user of the electronic device 101 is registered. According to an embodiment, when another card is not registered, the electronic device 101 may display a notification informing that another card should be first registered. In operation 709, the electronic device 101 may determine whether the user's agreement is identified. For example, the electronic device 101 may identify whether an input on the agreement button 824 within the screen 820 of FIG. 8B is detected. According to an embodiment, when the user has previously agreed with terms and conditions, the electronic device 101 may omit operations 707 and 709. When the user's agreement with terms and conditions is not identified, for example, when the user selects the cancel button 826 for displaying a user's disagreement, the electronic device 101 may end the operations.

When the user's agreement with terms and conditions is identified, for example, when the user selects the agreement button 824, the electronic device 101 may display a button for adding a card and information on the registered card in operation 711. For example, as illustrated in FIG. 8C, the electronic device 101 may display a button 832 for adding a card and/or a list 834 of the registered cards. In operation 713, the electronic device 101 may identify whether a command for card addition is detected. For example, the electronic device 101 may identify whether an input (for example, touch) for the button 832 for adding a card is detected in the screen 830 of FIG. 8C. When the command for the card addition is not detected, the electronic device 101 may perform an operation according to the detected command in operation 715. For example, the detected command may be one of end, cancel, or back.

Figure 8D:
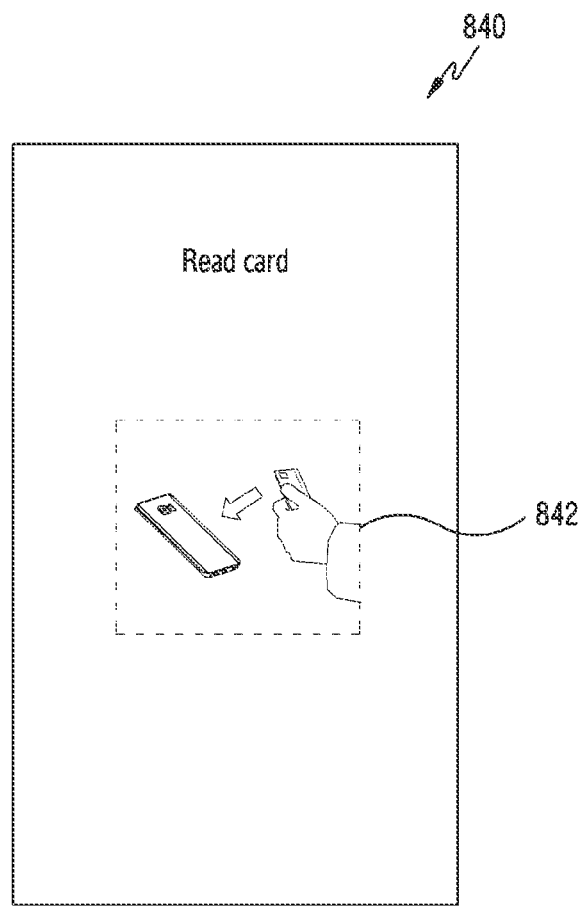

When the command for card addition is detected, the electronic device 101 may display a guidance screen for tagging in operation 717. The electronic device 101 may display a screen for inducing tagging of an original card. The electronic device 101 may display a screen for inducing the original card to be placed close to an NFC antenna of the electronic device 101. For example, as illustrated in FIG. 8D, the electronic device 101 may display a screen 840 including an image 842 indicating tagging.

In operation 719, the electronic device 101 may determine whether card duplication is possible. When the user tags the original card on the electronic device 101, the electronic device 101 may identify information on the original card and determine whether duplication is possible according to a first scheme on the basis of the identified information. When duplication is not possible, the electronic device 101 may display a notification informing that duplication is not possible in operation 721 and end the operations. According to an embodiment, the electronic device 101 may display a screen asking about duplication of another card. According to an embodiment, the electronic device 101 may display a screen asking about card duplication according to a second scheme.

Figure 8E:
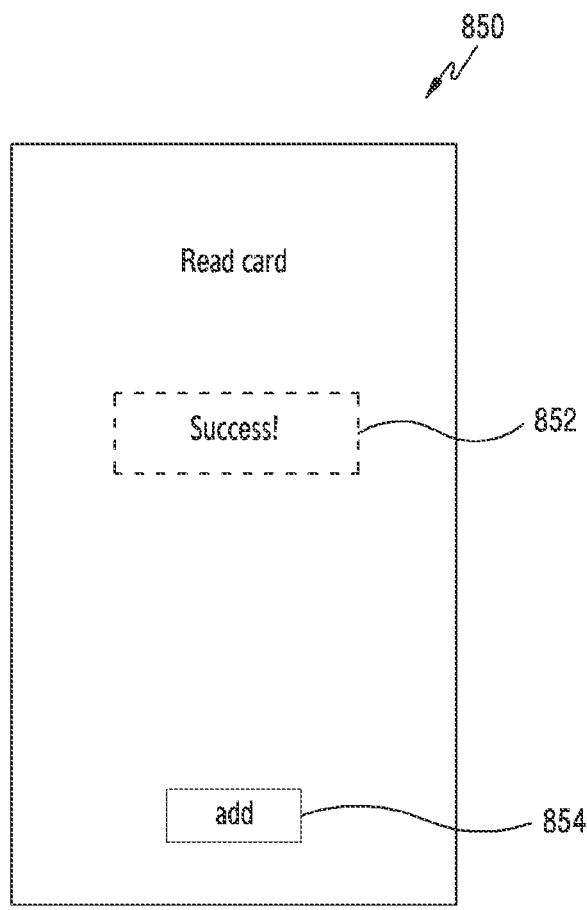

When duplication is possible according to the first scheme, the electronic device 101 may identify whether there is a copy card generated by another user in operation 723. For example, the electronic device 101 may inquire and/or request a server for managing the copy card to identify whether there is a copy card generated by another user. When there is a copy card generated by another user, the electronic device 101 may display a warning informing duplication by another user in operation 725. In operation 727, the electronic device 101 may determine whether a user's intention to perform duplication is identified. For example, the electronic device 101 may display a screen indicating succeed in acquisition of card information and identify the user's intention to perform duplication. For example, as illustrated in FIG. 8E, the electronic device 101 may display a screen 850 including a phrase 852 informing of success in acquisition of card information and/or a button 854 for identifying the user's intention to perform duplication. In another example, when duplication by another user is identified, the screen 850 may further include a warning phrase informing of duplication by another user.

Figure 8F:
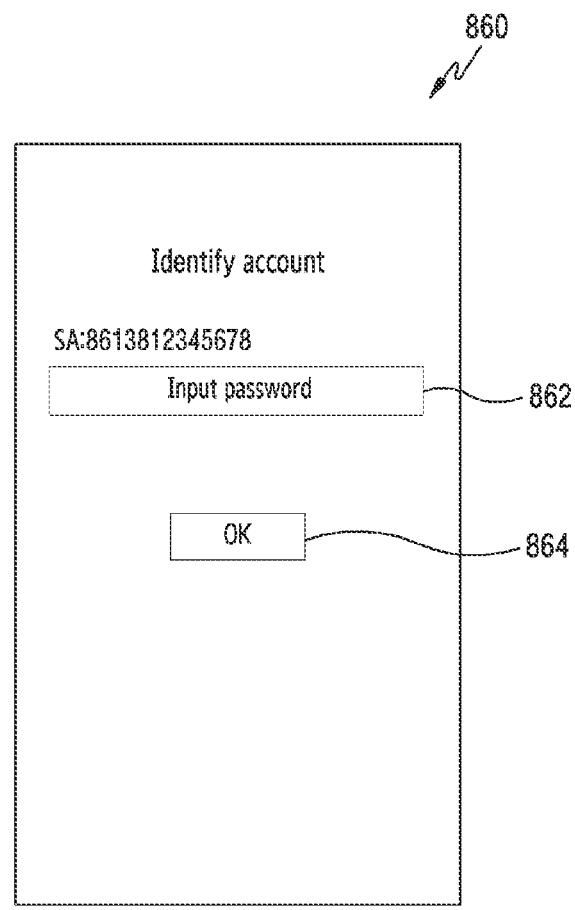

When the user's intention to perform duplication is identified, the electronic device 101 may display a screen making a request for user's account information in operation 729. For example, as illustrated in FIG. 8F, the electronic device 101 may display a password input box 862 and/or an OK button 864.

In operation 731, the electronic device 101 may determine whether a user's account is identified. For example, the corrected password is input into the screen 860 of FIG. 8F and the electronic device 101 may detect an input (for example, touch) on the OK button 864 so as to identify the user's account. When the user's account is identified, the electronic device 101 may store information on the card in operation 733. The electronic device 101 may register the information on the card inside the electronic device 101 (for example, the memory 160) and/or in a server for managing the copy card. The information on the card may be stored in the REE (for example, the REE module 322 of FIG. 3) or the TEE (for example, the TEE module 324 of FIG. 3) or in an area of a memory (for example, the memory 130 of FIG. 1) which can be accessed by the REE or the TEE together with account information. For example, the information on the card may include an ATQA, a UID, and/or an SAK.

Figure 8G:
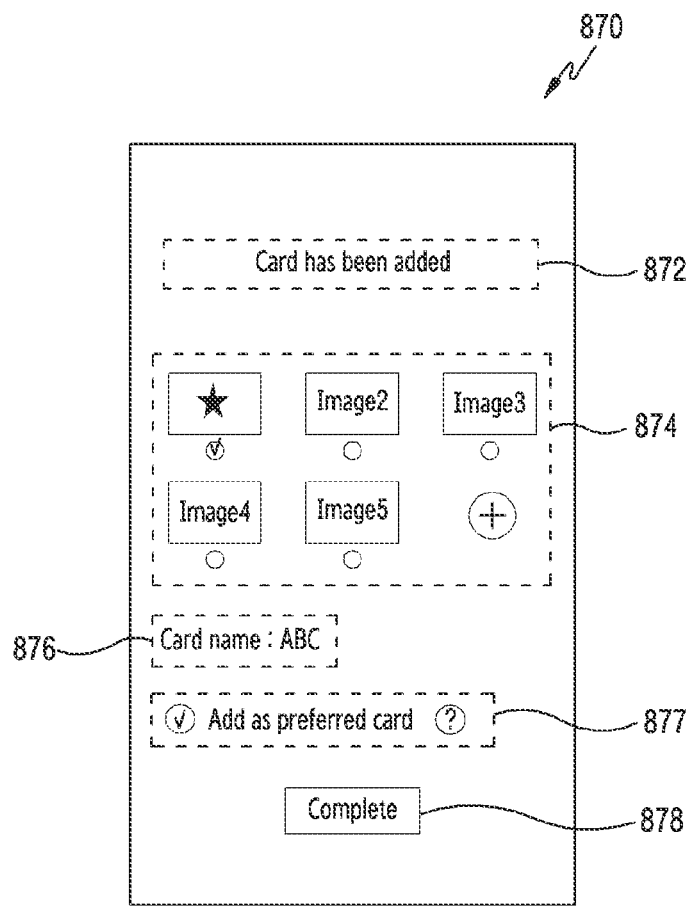
Figure 8H:
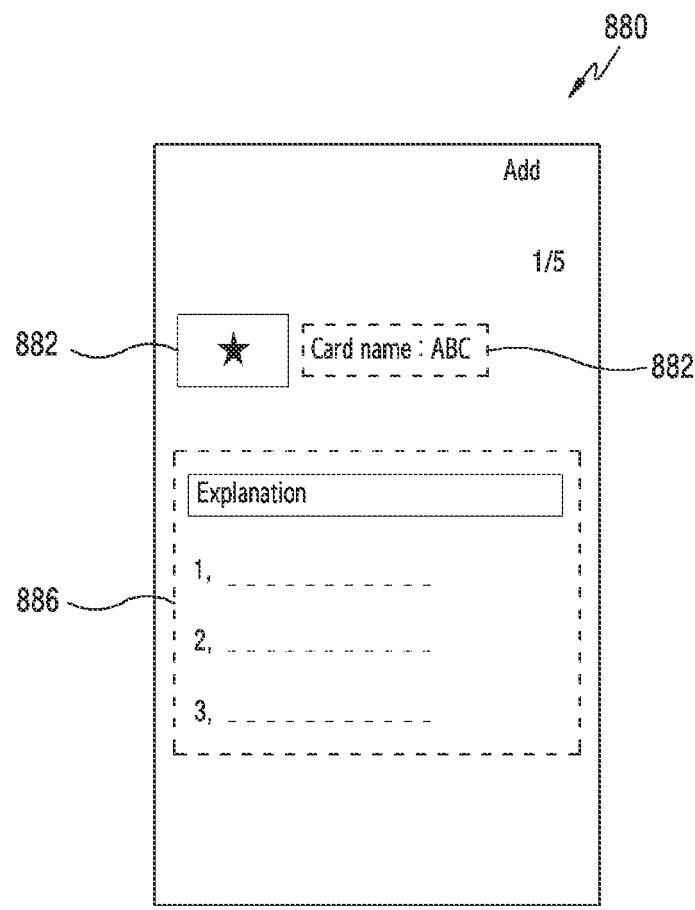

In operation 735, the electronic device 101 may display a screen making a request for selecting a card image. The electronic device 101 may display a screen for selecting the card image to show the copy card. For example, as illustrated in FIG. 8G, the electronic device 101 may include a screen 870 including a phrase 872 indicating card addition, a list 874 of selectable images, a card name 876, an item 877 for selecting an option for card addition (for example, addition as a preferred card), and/or a complete button 878. When the card is designated as a preferred card through the item 877, the corresponding card may be configured by default when a payment application is executed. In operation 737, the electronic device 101 may display a screen informing of the generation of the copy card. For example, as illustrated in FIG. 8H, the electronic device 101 may display a screen 880 including a selected card image 882, a card name 884, and/or an explanation 886 of the card.

In the embodiment described with reference to FIGS. 7A and 7B, when the card is duplicated by another user, the electronic device 101 may display warning. According to an embodiment, in addition to displaying warning, the electronic device 101 may ask the user about whether to read information on another user, and acquire and display the information on another user according to a request from the user. For example, when an agreement on information provision is made when another user duplicates the card, the information on another user may be acquired and displayed. When the information on another user is displayed, the user may receive help in determining whether to duplicate the card.

Figure 9:
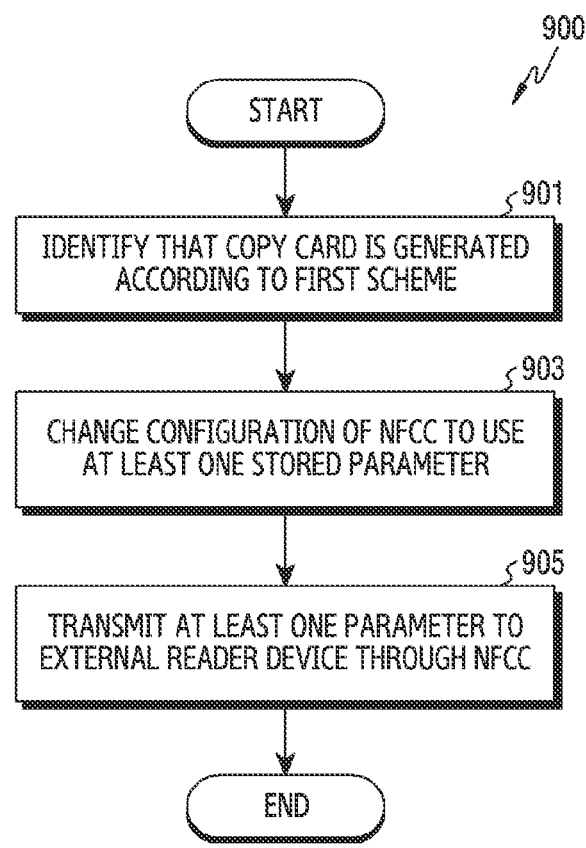
FIG. 9 is a flowchart illustrating an example operation in which the electronic device uses a copy card according to various embodiments.

FIG. 9 is a flowchart 900 illustrating an example operation in which the electronic device uses a copy card according to various embodiments. An entity of the operation performing the operation in the flowchart 900 of FIG. 9 may be understood as the electronic device 101 or an element of the electronic device 101 (for example, the processor 120 of FIG. 1 or the AP 320 of FIG. 3).

Referring to FIG. 9, in operation 901, the electronic device 101 (for example, the processor 120 or the AP 320) may identify that a copy card is generated according to a first scheme. The first scheme may be a scheme of generating a copy card by storing information which can be acquired without any authentication using a key when an original card of the copy card is a predetermined type card. For example, the electronic device may identify that the copy card is generated according to the first card by identifying information indicating the type of the copy card. The information indicating the type is information generated and/or used by the electronic device 101, and may be generated when the copy card is generated.

In operation 903, the electronic device 101 may change a configuration of an NFCC (for example, the NFCC 330 of FIG. 3) to use at least one stored parameter. For example, at least one stored parameter may include an ATQA, an SAK, and/or a UID. The electronic device 101 may control a wireless communication module (for example, the wireless communication module 192 of FIG. 2) to transmit a signal including at least one stored parameter by changing the configuration of the NFCC when the NFCC operates in a card mode.

In operation 905, the electronic device 101 may transmit at least one parameter to an external reader device (for example, the reader device 350 of FIG. 3) through the NFCC. The electronic device 101 may detect a polling signal from the external reader device and transmit at least one signal including at least one parameter through the wireless communication module in response to the polling signal.

Figure 10:
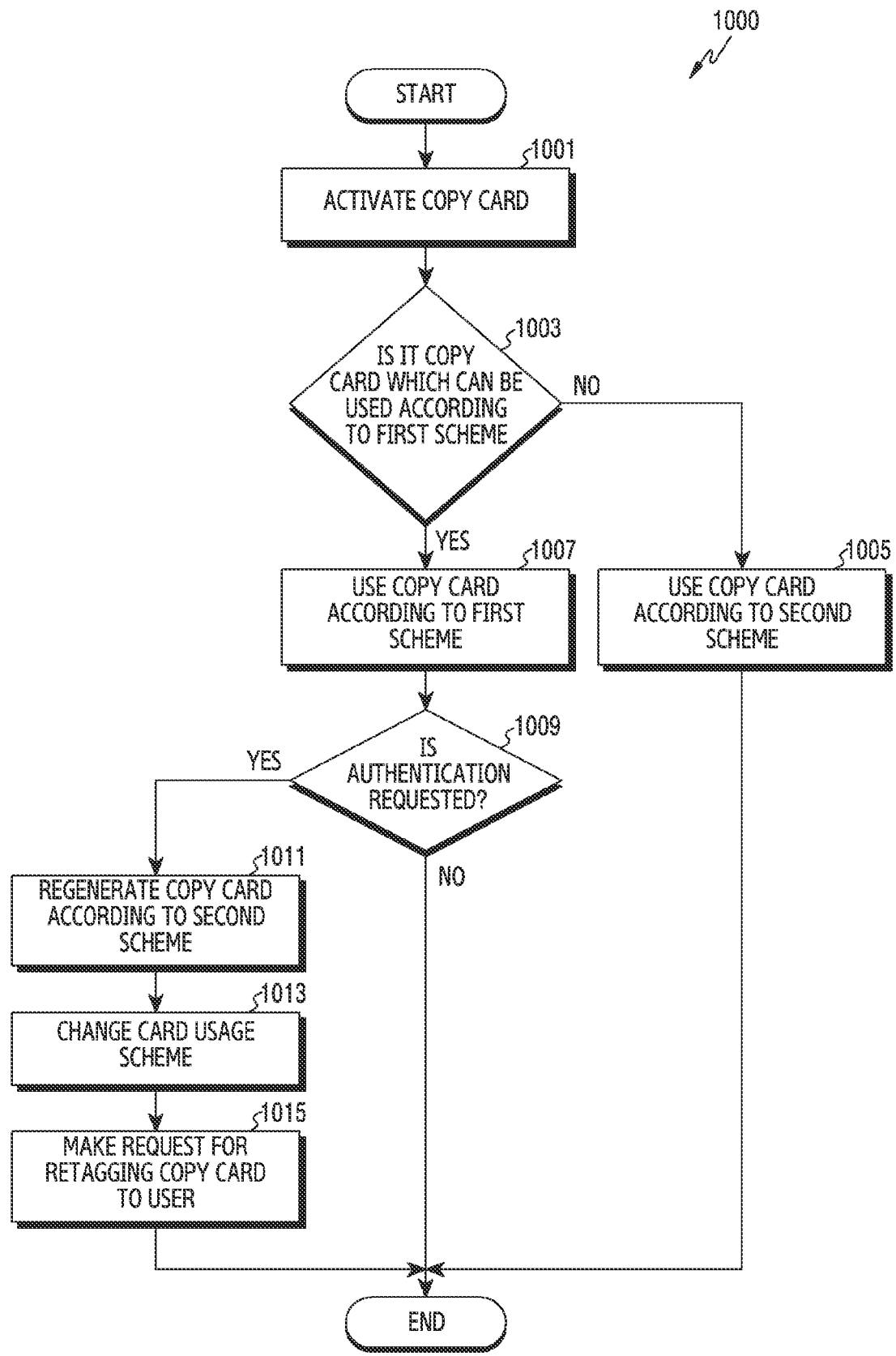
FIG. 10 is a flowchart illustrating an example operation in which the electronic device uses the copy card according to various embodiments.
Figure 11A:
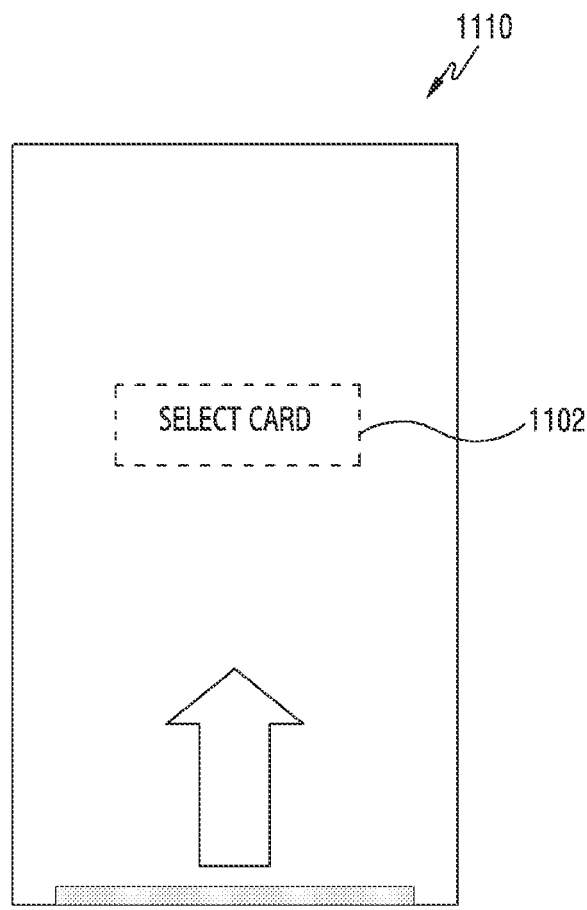
FIGS. 11A, 11B and 11C are diagrams illustrating examples of screens displayed during the operation in which the electronic device uses the copy card according to various embodiments.
Figure 11B:
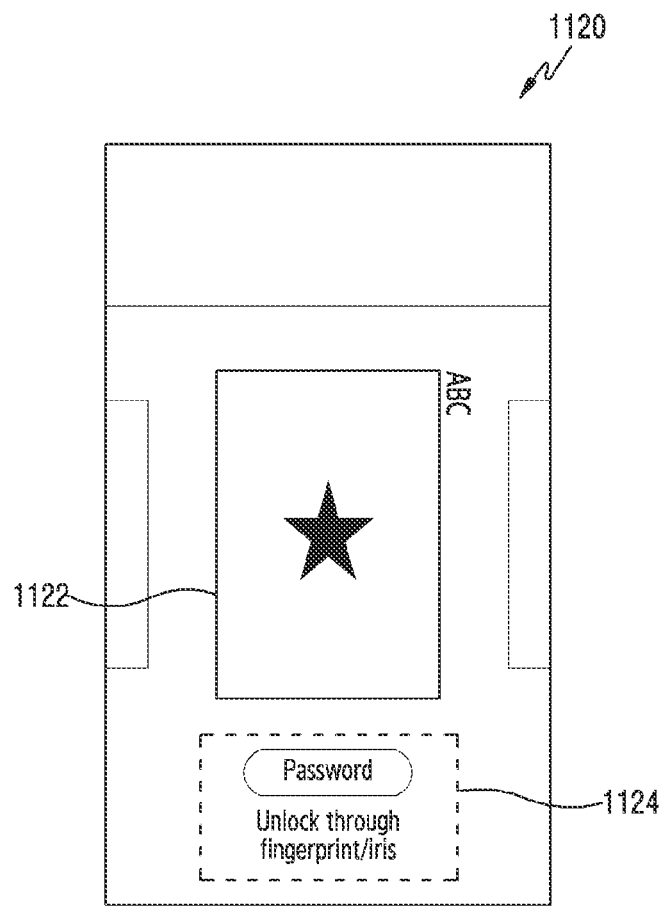
Figure 11C:
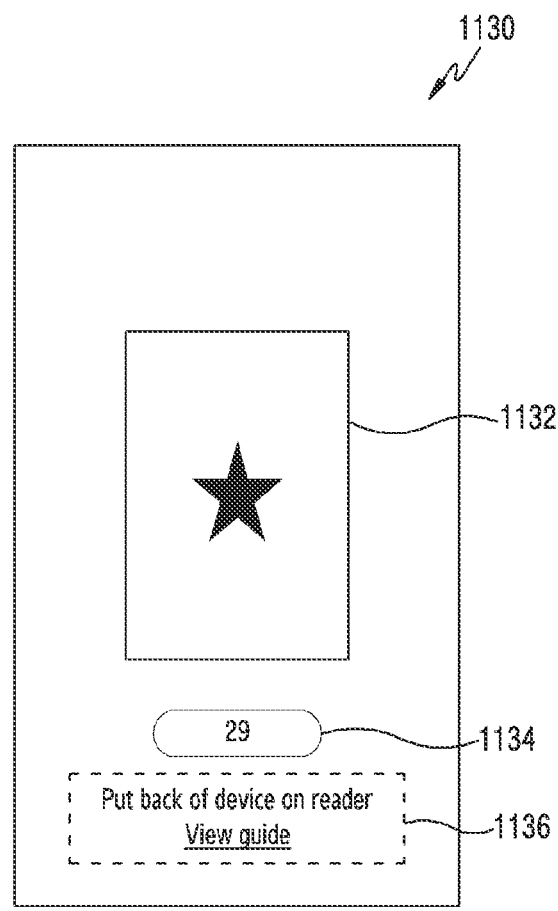

FIG. 10 is a flowchart 1000 illustrating an example operation in which the electronic device uses the copy card according to various embodiments. FIGS. 11A, 11B and 11C are diagrams illustrating examples of screens displayed during the operation in which the electronic device uses the copy card according to various embodiments. An entity of the operation performing the operation in the flowchart 1000 of FIG. 10 may be understood as the electronic device 101 or an element of the electronic device 101 (for example, the processor 120 of FIG. 1 or the AP 320 of FIG. 3).

Referring to FIG. 10, in operation 1001, the electronic device 101 (for example, the processor 120 or the AP 320) may activate the copy card. In order to activate the copy card, the electronic device 101 may identify selection of the copy card by the user. For example, referring to FIGS. 11A, 11B, and 11C, the electronic device 101 may display a screen 1110 including a phrase 1102 making a request for selecting a card, display a screen 1120 including an image 1122 of the copy card and/or an item 1124 making a request for an authentication (for example, password input, fingerprint authentication, and/or iris authentication) when a swipe input of the user is detected, and display a screen 1130 including an image 1132 of the copy card, a remaining time 1134 until the copy card is deactivated, and/or an explanation 1136 inducing tagging when the authentication is completed.

In operation 1003, the electronic device 101 may determine whether the copy card can be used according to a first scheme. The electronic device 101 may identify whether the selected copy card is duplicated according to the first scheme or a second scheme. For example, the electronic device 101 may identify whether the selected copy card is generated on the basis of information which can be acquired without any authentication using a key. When the copy card cannot be used according to the first scheme, the electronic device 101 can use the copy card according to the second scheme in operation 1005. When the copy card can be used according to the first scheme, the electronic device 101 can use the copy card according to the first scheme in operation 1007. For example, the electronic device 101 may change the configuration of the NFCC (for example, the NFCC 330 of FIG. 3) to use information acquired when the copy is duplicated and, when tagging on the reader device (for example, the reader device 350 of FIG. 3) is performed, control the NFCC to transmit a signal on the basis of the information acquired when the card is duplicated.

In operation 1009, the electronic device 101 may identify whether the authentication is requested. The electronic device 101 may identify whether an external reader device (for example, the reader device 350 of FIG. 3) makes a request for the authentication using a key value. For example, the authentication may be requested for an operation defined in International Organization for Standardization (ISO) Draft International Standard (DIS) 9798-2. For example, the electronic device 101 may determine whether the operation defined in ISO DIS 9798-2 is performed on the basis of whether the reader device transmits a native command (for example, authentication, block read, block write, block increment, block decrement, or block restore). A request for the authentication may refer, for example, to the original card not being an NFC card which can be used by duplication according to the first scheme. When the request for the authentication is not made, the copy card can be used, and thus the electronic device 101 may end the operations. The electronic device 101 may store information indicating that the copy card can be used in the corresponding external read device.

On the other hand, when the request for the authentication is made, the electronic device 101 may identify that the copy card cannot be used in the corresponding external reader device according the first scheme and regenerate the copy card according to the second scheme in operation 1011. For example, the electronic device 101 may generate the copy card using a TSM server (for example, the server 108 of FIG. 3) and a secure element (for example, the eSE 340 of FIG. 3). The electronic device 101 may receive information on the card from the TSM server and store an instance including the received information in the secure element. According to an embodiment, the electronic device 101 may delete and/or discard the generated copy card according to the first scheme.

In operation 1013, the electronic device 101 may change a card usage scheme. Since the copy card is regenerated according to the second scheme, the electronic device 101 may perform control to use the copy card according to the second scheme. For example, the electronic device 101 may activate the instance stored in the secure element using the TEE and update an RF parameter of the NFCC. In operation 1015, the electronic device 101 may make a request for retagging on the reader device to the user in order to use the copy card. The electronic device 101 may display a screen indicating retagging the electronic device 101 on the reader device.

Figure 12:
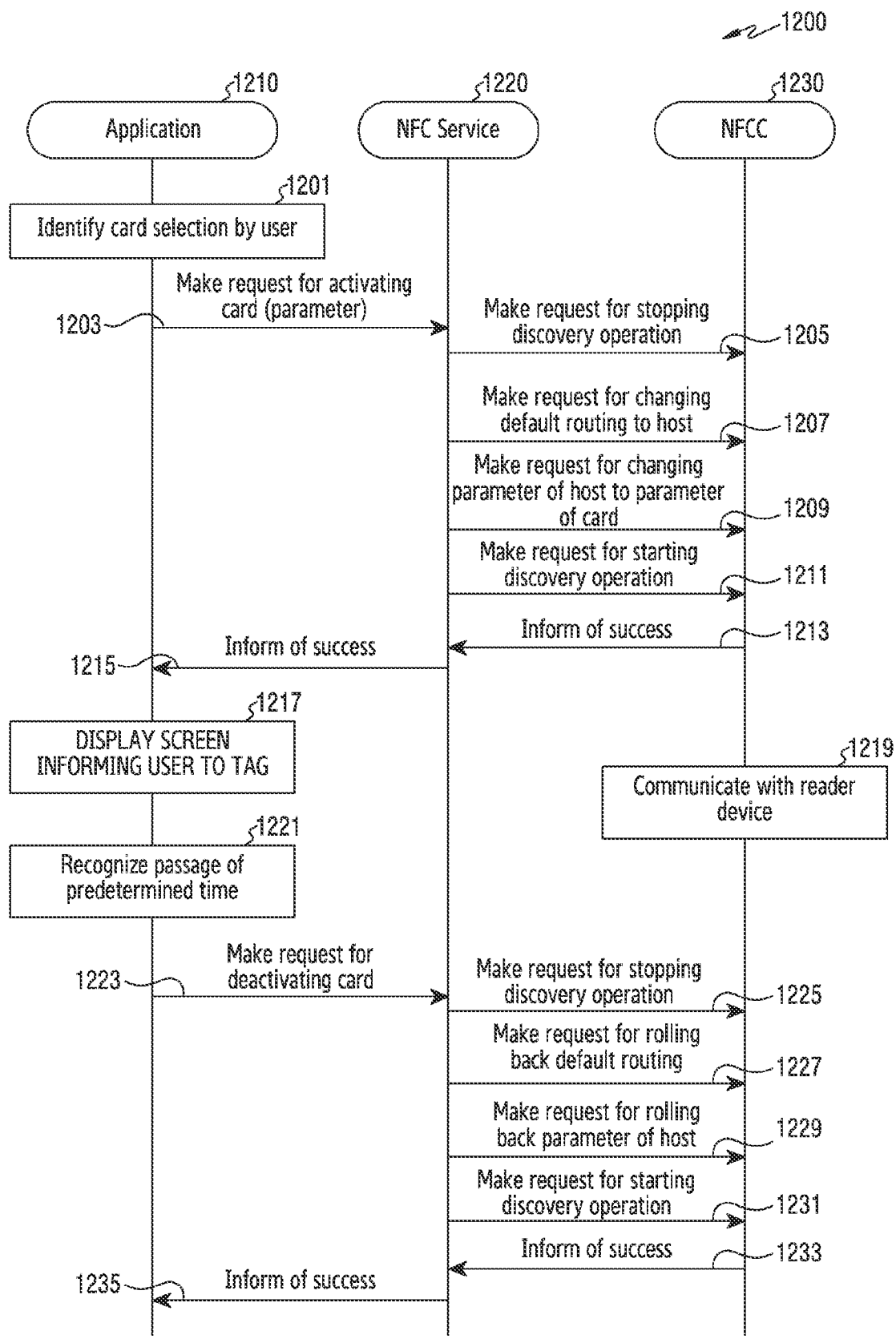
FIG. 12 is a signal flow diagram illustrating a signal exchange within the electronic device when the electronic device uses a copy card according to various embodiments.

FIG. 12 is a signal flow diagram 1200 illustrating example signal exchange in the electronic device when the electronic device uses a copy card according to various embodiments. The diagram 1200 of FIG. 12 illustrating the signal exchange shows a signal exchange between an application 1210, an NFC service 1220, and an NFCC 1230. The application 1210 and the NFC service 1220 are software, and an actual operation entity may be the processor 120 of FIG. 1 or the AP 320 of FIG. 3. The application 1210 is an application related to the card, and may be, for example, a payment application (for example, the first card-related app 326a or the second card-related app 326b of FIG. 3). The NFC service 1220 may be software for interfacing between the application 1210 and the NFCC 1230.

Referring to FIG. 12, in operation 1201, the application 1210 may identify selection of a copy card by the user. The selected of the card by the user may be determined by an authentication of the user. In operation 1203, the application 1210 may transmit a card activation request to the NFC service 1220. The card activation request may include a parameter (for example, an ATQA, a UID, and/or a SAK) for the card.

In operation 1205, the NFC service 1220 may make a request for stopping a discovery operation to the NFCC 1230. In order to change an RF parameter of the NFCC 1230, the NFC service 1220 may make a request for stopping a reader mode operation and a card mode operation of the NFCC 1230. In operation 1207, the NFC service 1220 may make a request for changing default routing to a host to the NFCC 1230. The host may include the AP 320. In operation 1209, the NFC service 1220 may make a request for changing a parameter of the host to a parameter of the card to the NFCC 1230. The NFC service 1220 may make a request for using the parameter (for example, parameter acquired when the copy card is generated) stored in the host as a parameter operating as the card to the NFCC 1230. In operation 1211, the NFC service 1220 may make a request for starting the discovery operation to the NFCC 1230. The discovery operation requested in operation 1211 may be an operation in the card mode including listening.

In operation 1213, the NFCC 1230 may transmit a success notification to the NFC service 1220 in the electronic device 101. In operation 1215, the NFC service 1220 may transmit the success notification to the application 1210. In operation 1217, the application 1210 may display a screen (for example, the screen 1130 of FIG. 11C) instructing the user to tag. In operation 1219, the NFCC 1230 may communicate with a reader device (for example, the reader device 350 of FIG. 3). The NFCC 1230 may transmit information on the card in the card mode.

In operation 1221, the application 1210 may recognize passage of a predetermined time. In operation 1223, the application 1210 may make a request for deactivating the card to the NFC service 1220. In operation 1225, the NFC service 1220 may make a request for stopping the discovery operation to the NFCC 1230. In operation 1227, the NFC service 1220 may make a request for rolling back default routing to the NFCC 1230. In operation 1229, the NFC service 1220 may make a request for rolling back the parameter of the host to the NFCC 1230. In operation 1231, the NFC service 1220 may make a request for starting the discovery operation to the NFCC 1230. The discovery operation requested in operation 1231 may be an operation in the card mode and the reader mode including listening and polling. In operation 1233, the NFCC 1230 may transmit the success notification to the NFC service 1220. In operation 1235, the NFC service 1220 may transmit the success notification to the application 1210.

In the example embodiment described with reference to FIG. 12, the application 1210 may start operations for deactivating the copy card according to recognition of passage of the predetermined time. According to an embodiment, even before the predetermined time passes, the application 1210 may start operations for deactivating the copy card according to a stop or end command of the user. According to an embodiment, even before the predetermined time passes, the application 1210 may start operations for deactivating the copy card according to finish of the use of the copy card.

As described with reference to FIG. 12, when the copy card generated according to the first scheme is used, the application 1010 may perform control to use the copy card by only providing information on the stored copy card (for example, an ATAQ, a UDI, and/or an SAK) to the NFC service 1020.

In the embodiment described with reference to FIG. 12, at least some of operations 1225 to 1231 may be combined and performed. For example, in operations 1225, 1227, 1229, and 1231, information transmitted from the NFC service 1220 to the NFCC 1220 may be transmitted through one signal or three or fewer signals. For example, when the NFC service 1220 transmits a card deactivation request to the NFCC 1230, operations 1225 to 1231 may be performed through one signaling or two or more signalings.

Figure 13:
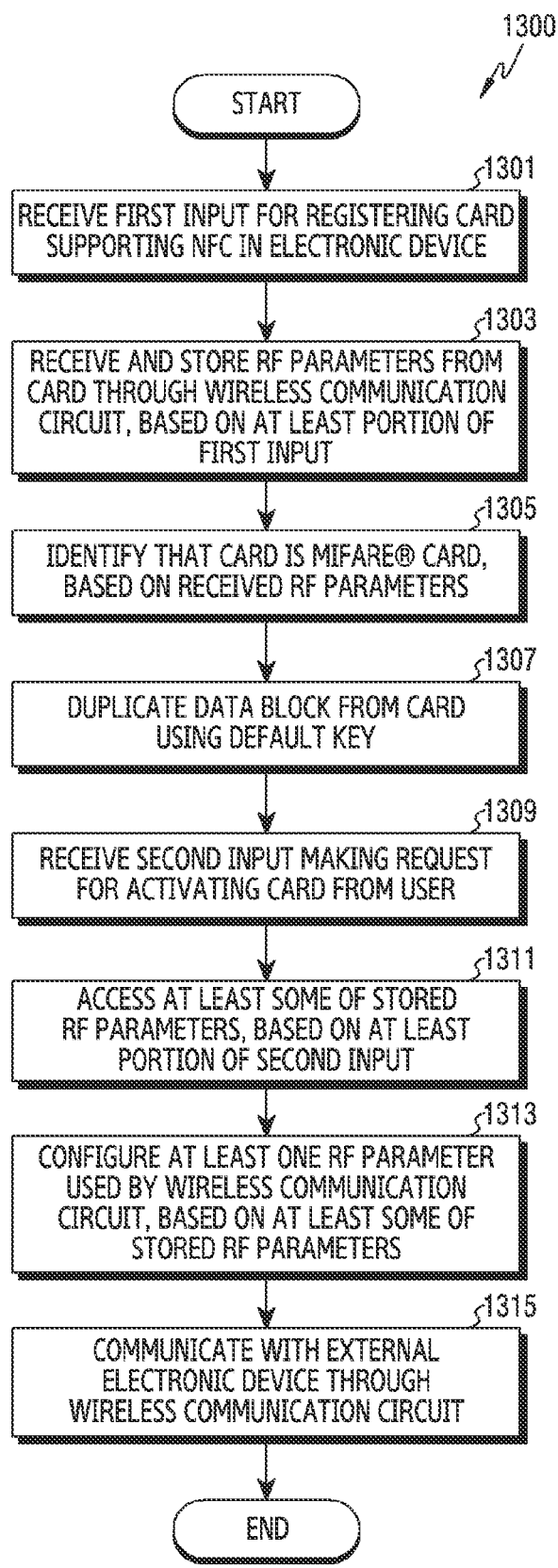
FIG. 13 is a flowchart illustrating an example operation in which the electronic device generates and uses a copy card according to various embodiments.

FIG. 13 is a flowchart 1300 illustrating an example operation in which the electronic device generates and uses a copy card according to various embodiments. An entity of the operation performing the operation in the flowchart 1300 of FIG. 13 may be understood as the electronic device 101 or an element of the electronic device 101 (for example, the processor 120 of FIG. 1 or the AP 320 of FIG. 3).

Referring to FIG. 13, in operation 1301, the electronic device 101 (for example, the processor 120 or the AP 320) may receive a first input for registering a card supporting NFC in the electronic device. For example, the electronic device 101 may display a screen (for example, the screen 710 of FIG. 8A, the screen 830 of FIG. 8C, and/or the screen 840 of FIG. 8D) including an interface for generating a copy card and detect a user's command input through the interface.

In operation 1303, the electronic device 101 may receive and store RF parameters from the card through a wireless communication circuit (for example, the NFC module 230 of FIG. 2 or the NFCC 330 of FIG. 3) on the basis of at least a portion of the first input. For example, the RF parameters may include an ATQA, an SAK, and/or a UID. For example, the RF parameters may be stored in a memory area which can be accessed by an REE (for example, the REE module 322 of FIG. 3) or a TEE (for example, the TEE module 324 of FIG. 3).

In operation 1305, the electronic device 101 may identify that the card is a specified type of card, e.g., a Mifare Classic® card, on the basis of the received RF parameters. For example, the electronic device 101 may detect values of at least some of the RF parameters to identify that the card is a Mifare Classic® card. For example, when a value of a specific bit (for example, a sixth bit) of the SAK received from the card is not a predetermined value (for example, 1), the electronic device 101 may determine that the card is a Mifare Classic® card.

In operation 1307, the electronic device 101 may duplicate a data block from the card using a default key. For example, the electronic device 101 may authenticate the card using the default key (for example, FFFFFFFFFFFF) and duplicate the data block acquired after the authentication. For example, for the authentication, the electronic device 101 may transmit and/or receive at least one random value encrypted by the NFC card and the key to perform the authentication and then acquire the data block.

In operation 1309, the electronic device 101 may receive a second input making a request for activating the card from the user. Activation of the card may be triggered by a user's command. For example, the electronic device 101 may display a screen (for example, the screen 1110 of FIG. 11A and/or the screen 1120 of FIG. 11B) including an interface for the use of the copy card and detect a user's command input through the interface.

In operation 1311, the electronic device 101 may access at least some of the stored RF parameters on the basis of at least a portion of the second input. The electronic device 101 may access a memory area storing the RF parameters using the REE or the TEE and load the RF parameters to the AP (for example, the AP 320).

In operation 1313, the electronic device 101 may receive at least one RF parameter used by a wireless communication circuit (for example, the wireless communication circuit 192 of FIG. 1 or the NFC module 230 of FIG. 2) from the card and perform a configuration on the basis of at least some of the stored RF parameters. The electronic device 101 may change the configuration of the wireless communication circuit performing NFC on the basis of the stored RF parameters. For example, the electronic device 101 may change default routing of the wireless communication circuit to a host (for example, the AP 320) and control the wireless communication circuit to use RF parameters loaded to the host.

In operation 1315, the electronic device 101 may communicate with an external electronic device through the wireless communication circuit. For example, the external electronic device may be an external NFC reader device (for example, the reader device 350). The electronic device 101 may transmit a signal including at least some of the RF parameters to the external electronic device through the wireless communication circuit.

According to various embodiments described above, the generated and/or used copy card may be deleted according to a user's command. For example, the copy card may be deleted when the user may specifically delete the corresponding copy card, delete a card-related application, delete data related to the card-related application, log out an account, or delete all pieces of card-related information, or the electronic device 101 is reset (factory reset). When only the copy card is specifically deleted, information on the corresponding card (for example, an ATQA, a UID, and an SAK) and block information may be deleted from the server.

According to various example embodiments of the disclosure, a method of operating an electronic device (for example, the electronic device 101) may include: detecting tagging of an NFC card, acquiring at least one parameter related to the NFC card, and based on the NFC card satisfying a specified condition, generating a copy card of the NFC card by storing the at least one parameter, wherein the specified condition comprises that an NFC card is of a specified type and an NFC card uses a default key.

According to various example embodiments of the disclosure, the at least one parameter may be information which can be acquired without any authentication using a key, and the at least one parameter may include at least one of an Answer to Request (ATQA), a Unique Identifier (UID), or a Selection Acknowledge (SAK).

According to various example embodiments of the disclosure, the method may further include determining whether the NFC card is the card in the predetermined type by checking values of the at least one parameter.

According to various example embodiments of the disclosure, the method may further include determining whether the NFC card uses the default key by attempting an authentication of the NFC card using the default key.

According to various example embodiments of the disclosure, the method may further include based on the NFC not satisfying the predefined condition, generating the copy card by acquiring information on the NFC card from a Trust Service Management (TSM) server (for example, the server 108) and storing an instance generated based on the acquired information in a secure element.

According to various example embodiments of the disclosure, the at least one parameter may be stored in a Rich trusted Execution Environment (REE) or a Trusted Execution Environment (TEE).

According to various example embodiments of the disclosure, the method may further include identifying that the NFC card is duplicated by another user, displaying a warning informing of the duplication by the another user, and displaying information on the another user.

According to various example embodiments of the disclosure, a method of operating an electronic device (for example, the electronic device 101) may include: based on a copy card being selected by a user and an original card of the copy card being a specified type of card, identifying that the copy card is generated based on information which can be acquired without any authentication using a key, changing a configuration of an NFCC (for example, the NFCC 330) to use at least one parameter related to the stored copy card, and transmitting the at least one parameter to an external reader device through the NFCC.

According to various example embodiments of the disclosure, the at least one parameter may be information which can be acquired without any authentication using a key, and the at least one parameter may include at least one of an Answer to Request (ATQA), a Unique Identifier (UID), or a Selection Acknowledge (SAK).

According to various example embodiments of the disclosure, the changing the configuration of the NFCC may include stopping a discovery operation of the NFCC, changing default routing of the NFCC to a host, changing a parameter of the host to the at least one parameter, and starting the discovery operation of the NFCC.

According to various example embodiments of the disclosure, the method may further include recovering the configuration of the NFCC when the use of the copy card ends.

According to various example embodiments of the disclosure, the recovering the configuration of the NFCC may include stopping the discovery operation of the NFCC, rolling back default routing of the NFCC and the parameter of the host, and starting the discovering operation of the NFCC.

According to various example embodiments of the disclosure, the method may further include based on an authenticating using a key being requested by the external reader after the at least one parameter is transmitted, regenerating the copy card by acquiring information on an original card from a Trust Service Management (TSM) server and storing an instance generated based on the acquired information in a secure element.

According to various example embodiments of the disclosure, the method may further include displaying a screen making a request for retagging on the external reader to the user after regenerating the copy card.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A method of operating an electronic device, the method comprising:
   receiving a first input for registering card information of a Near Field Communication (NFC) card with the electronic device;
   detecting tagging of (the NFC) card;
   acquiring at least one Radio Frequency (RF) parameter related to the NFC card including a Selection Acknowledge (SAK) from the NFC card;
   identifying the NFC card satisfying a specified condition, based on the identification of the NFC card being of a specified type by checking value of the acquired SAK and the NFC card using a default key;
   based on the NFC card satisfying the specified condition, generating a copy card information of the NFC card by storing the acquired at least one RF parameter.

2. The method of claim 1, wherein the at least one parameter includes information which can be acquired without any authentication using a key, and the at least one RF parameter comprises at least one of an Answer to Request (ATQA), or a Unique Identifier (UID).

3. The method of claim 1, further comprising determining whether the NFC card is of the specified type by checking value of a specific bits of the-SAK.

4. The method of claim 1, further comprising determining whether the NFC card uses the default key by attempting an authentication of the NFC card using the default key.

5. The method of claim 1, further comprising, based on the NFC card not satisfying the specified condition, acquiring information on the NFC card from a Trust Service Management (TSM) server, and registering the card information by storing an instance generated based on the acquired information in a secure element.

6. The method of claim 1, wherein the at least one parameter is stored in a Rich trusted Execution Environment (REE) or a Trusted Execution Environment (TEE).

7. The method of claim 1, further comprising: identifying that the NFC card is duplicated by another user; displaying warning informing of the duplication by the another user; and displaying information on the another user.

8. An electronic device comprising: a wireless communication circuit configured to support a Near Field Communication (NFC) protocol; a display; a processor operatively connected to the wireless communication circuit and the display; and a memory operatively connected to the processor, wherein the memory stores instructions which, when executed, cause the processor to: receive a first input for registering card information of an external card supporting NFC in the electronic device, receive Radio Frequency (RF) parameters including an Answer to Request (ATQA), a Selection Acknowledge (SAK), and a Unique Identifier (UID) from the external card through the wireless communication circuit, based on the first input, store the received RF parameters identify whether the external card is a specified type of card, based on the received SAK, register the card information by obtaining a data block from the external card using a default key, based on the external card being the specified type of card, receive a second input for using the registered card information, determine at least some of the stored RF parameters for using the card information, based on the card information of the external card being the specified type of card, and communicate with an external electronic device using the determined at least some of stored RF parameters for using the card information, through the wireless communication circuit.

9. The electronic device of claim 8, wherein the instructions, when executed, cause the processor to determine whether the external card is the specified type of card, based on a sixth bit of the received SAK.

10. The electronic device of claim 8, wherein the instructions, when executed, cause the processor to, based on the data block not being able to be duplicated from the external card using the default key, control the display to display a notification indicating failure in the duplication of the external card through the display.

11. The electronic device of claim 10, wherein the instructions, when executed, cause the processor to, based on the data block not being able to be obtained from the external card using the default key, acquire information on the external card from a Trust Service Management (TSM) server and store an instance generated based on the acquired information in a secure storage.

12. The electronic device of claim 8, wherein the instructions, when executed, cause the processor to determine whether an authentication information request is received from the external electronic device and delete the stored RF parameters, in response to the authentication information request, based on a determination result.

13. The electronic device of claim 8, wherein the RF parameters are stored in a Rich trusted Execution Environment (REE) or a Trusted Execution Environment (TEE).

14. A method of operating an electronic device, the method comprising: receiving a user input for selecting card information; in response to the selection of the card information, identifying information indicating a type of the card information; based on the information indicating the type of the card information, changing a configuration of a near field communication controller (NFCC) to use at least one Radio Frequency (RF) parameter related to the card information; and transmitting the at least one RF parameter to an external reader device through the NFCC wherein the information indicating the type of the card information is generated by storing information which can be acquired without any authentication using a key when an original card of the card information is a specified type card, and wherein the at least one RF parameter includes a Selection Acknowledge (SAK) for the external reader device to identify whether the type of the copy information corresponds a specified type of card.

15. The method of claim 14, wherein the at least one parameter includes: information which can be acquired without any authentication using a key, and the at least one RF parameter comprises at least one of an Answer to Request (ATQA), or a Unique Identifier (UID).

16. The method of claim 14, wherein the changing the configuration of the NFCC includes: stopping a discovery operation of the NFCC, changing default routing of the NFCC to a host, changing a parameter of the host to the at least one parameter, and starting the discovery operation of the NFCC.

17. The method of claim 14, further comprising: recovering the configuration of the NFCC based on the use of the copy card ends.

18. The method of claim 17, wherein the recovering the configuration of the NFCC includes: stopping a discovery operation of the NFCC, rolling back default routing of the NFCC and a parameter of a host, and starting the discovering operation of the NFCC.

19. The method of claim 14, further comprising: based on an authenticating using the key being requested by the external reader after the at least one parameter is transmitted, regenerating the copy card by acquiring information on an original card from a Trust Service Management (TSM) server and storing an instance generated based on the acquired information in a secure storage.

20. The method of claim 19, further comprising: displaying a screen making a request for retagging on the external reader to the user after regenerating the copy card.

* * * * *